United States Patent [19]

Suzuki

[11] Patent Number: 5,501,017
[45] Date of Patent: Mar. 26, 1996

[54] METHOD AND APPARATUS FOR MEASURING A FRAME CONFIGURATION

[75] Inventor: Yasuo Suzuki, Tokyo, Japan

[73] Assignee: Kabushiki Kaisha Topcon, Tokyo, Japan

[21] Appl. No.: 384,006

[22] Filed: Feb. 6, 1995

[30] Foreign Application Priority Data

Feb. 7, 1994 [JP] Japan .................... 6-013748

[51] Int. Cl.$^6$ .................................... G01B 7/28
[52] U.S. Cl. .................. 33/200; 33/551; 33/507
[58] Field of Search .................. 33/1 M, 28, 200,
33/501, 507, 533, 551, 553, 554; 364/560;
451/5, 9, 255, 256

[56] References Cited

U.S. PATENT DOCUMENTS

| | | | |
|---|---|---|---|
| 4,989,338 | 2/1991 | Tsuji et al. ................ | 33/554 |
| 4,995,170 | 2/1991 | Brule et al. ................ | 33/200 |
| 5,121,550 | 6/1992 | Wood et al. ................ | 451/256 |

FOREIGN PATENT DOCUMENTS

| | | | |
|---|---|---|---|
| 4214395 | 11/1993 | Germany ................ | 033/200 |
| 64-513 | 1/1989 | Japan ................ | 033/200 |
| 3-135708 | 6/1991 | Japan ................ | 033/200 |

Primary Examiner—William A. Cuchlinski, Jr.
Assistant Examiner—G. Bradley Bennett
Attorney, Agent, or Firm—Finnegan, Henderson, Farabow, Garrett & Dunner

[57] ABSTRACT

An arithmetic and control circuit 600 calculates an angle θ of inclination of one of lens frames 501, 501 of an eyeglass frame 500 from the maximum and minimum of height data $Z_n$ of frame configuration information L ($_\emptyset\rho_n$, $_\emptyset\theta_n$, $Z_n$) about the lens frame (left lens frame) 501. If the angle θ exceeds a given angle β, the arithmetic and control circuit 600 adjusts a frame holder 100 holding the eyeglass frame 500 so as to make the angle θ smaller than the given angle β. After that, the arithmetic and control circuit 600 again calculates height data $Z_n$ in the direction of a Z-axis relative to radius vector information ($_\emptyset\rho_n$, $_\emptyset\theta_n$) to obtain first true frame configuration information L ($_\emptyset\rho_n'$, $_\emptyset\theta_n$, $Z_n$) about the lens frame 501 in three dimensional directions. Further, the arithmetic and control circuit 600 calculates a radius vector data difference $\Delta\rho_n$ ($\Delta\rho_n = \rho_n' - \rho_n$) per rotation angle $\theta_n$ and adds the resultant data difference $\Delta\rho_n$ to $\rho_n$ of frame configuration information R ($_\emptyset\rho_n$, $_\emptyset\theta_n$, $Z_n$) about the other lens frame (right lens frame) 501 per rotation angle $\theta_n$ to obtain true frame configuration information R (($_\emptyset\rho_n + \Delta\rho_n$), $_\emptyset\theta_n$, $Z_n$) about the other lens frame 501.

4 Claims, 19 Drawing Sheets

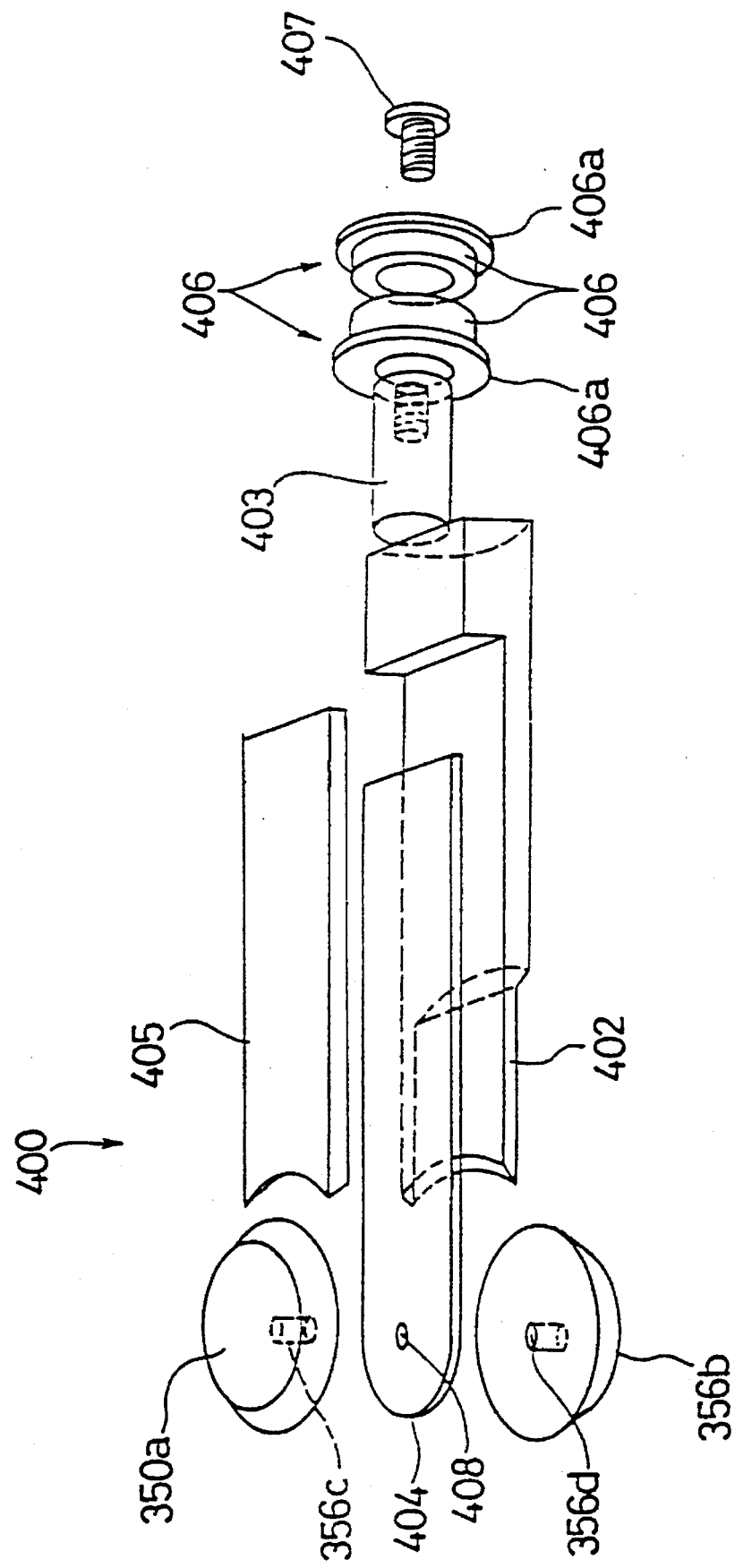

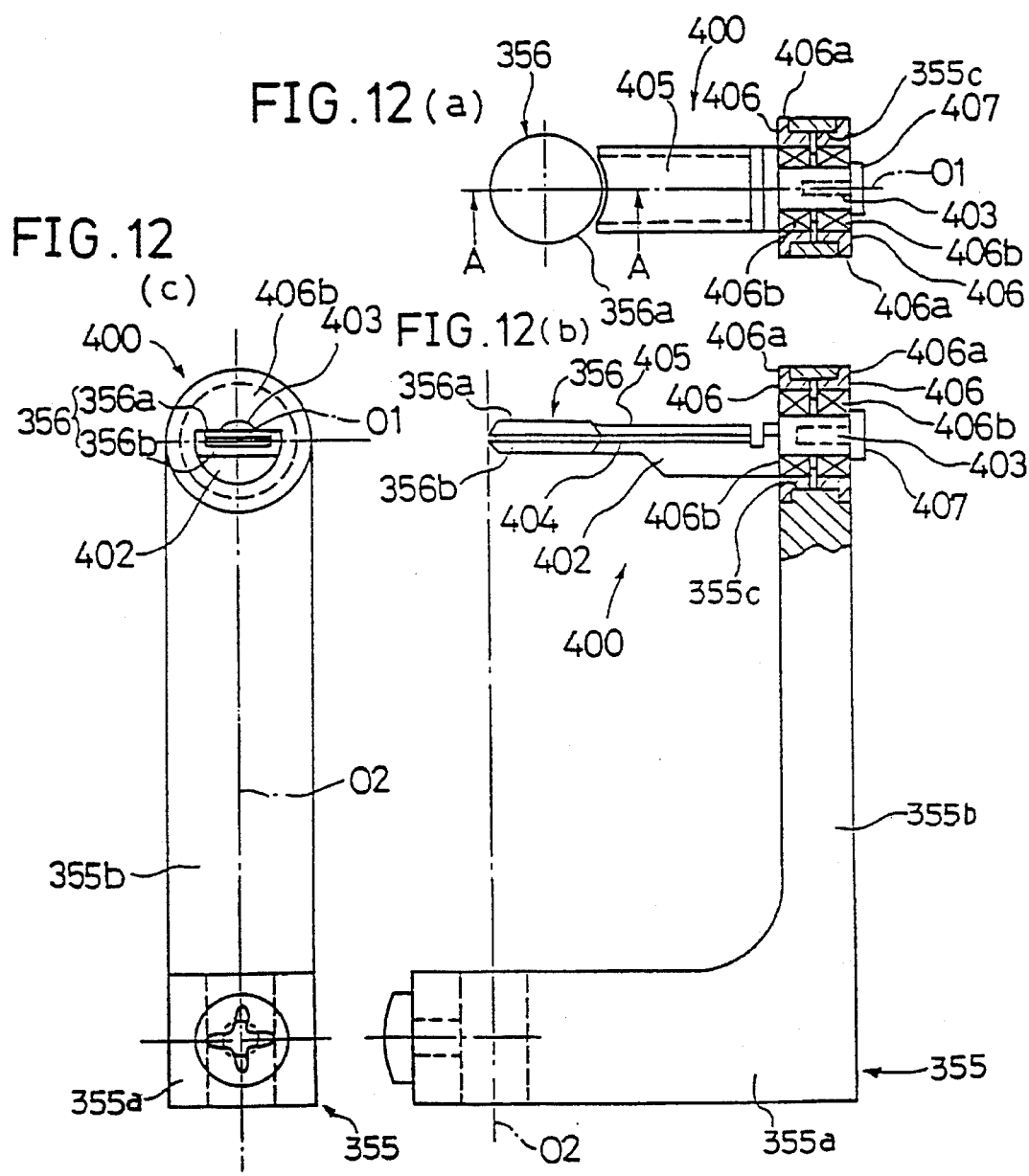
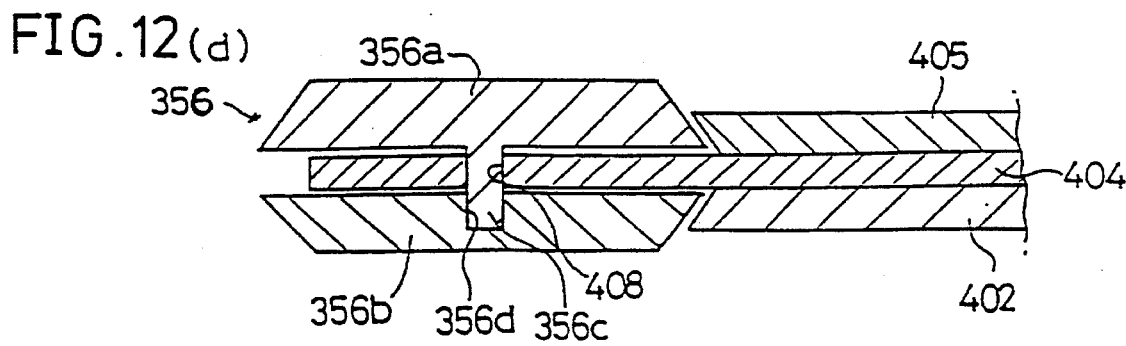

5,501,017

METHOD AND APPARATUS FOR MEASURING A FRAME CONFIGURATION

BACKGROUND OF THE INVENTION

1. Field of the Invention

This invention relates to a method and apparatus for digitally measuring the configuration of a lens frame of an eyeglass frame or the configuration of a template obtained by copying the lens frame, and more particularly to a frame configuration measuring method and apparatus suitable for use in combination with a lens grinding machine for grinding an optical lens blank in accordance with data concerning the configuration of the lens frame or template.

2. Description of the Prior Art

As shown in FIG. 20(a), in a conventional apparatus for measuring the configuration of a lens frame, right and left lens frames (frame rims) 3, 3' of an eyeglass frame 2 are first brought into contact with a surface 1 (measurement reference surface) of a frame holding device, not shown, and are maintained thereon by a maintaining rod, not shown, provided with a spring. Thereafter, as shown in FIG. 21(a), a beveled feeler 5 is brought into contact with a V-shaped groove 4 of the lens frame 3 and moved along the groove 4, so that the track of the feeler 5 is three-dimensionally detected to measure the configuration of the lens frame 3. Likewise, the configuration of the other lens frame 3' is measured. In FIG. 21(a), reference characters 4a, 4b each designate a slope of the V-shaped groove 4.

Generally, the front of the eyeglass frame 2 is curved as shown in FIGS. 20(a) and 21(a). For this reason, part 7 of the lens frame 3' close to a temple (sidepiece) of the eyeglass frame 2 is spaced from the measurement reference surface 1 when part of the lens frame 3' close to a bridge 6 between the lens frames 3, 3' is maintained in contact with the surface 1 by means of the maintaining rod.

In order to measure the accurate size and shape of the lens frames 3, 3', a coincidence is required between angle γ and angle δ. As shown in FIG. 21(b), γ is an angle formed by a plane including the apex of the edge of a ground lens L and a center line passing through the bottom of of the V-shaped groove 4, whereas δ is an angle formed by a plane including the apex of the feeler 5 and the center line passing through the bottom of of the V-shaped groove 4.

However, there is a case in which the edge of a lens blank (material lens) is ground according to incorrect data on the position of the apex of the feeler 5 obtained by the disagreement between angle γ and angle δ because of the inclination of the lens frames 3, 3' with respect to the surface 1. In that case, the lens L is ground to have a size c different from a true size d thereof, as shown in FIG. 21(a). Consequently, as shown in FIG. 21(c), the finished lens L of the size c does not fit the lens frames 3, 3' of the size d.

To overcome this fault, the following method can be adopted. That is, the configuration of the lens frame 3 is first measured preliminarily, and then the inclination of the lens frame 3 with respect to the surface 1 is calculated from configuration data obtained by the preliminary measurement. Thereafter, in order to obtain true configuration data on the lens frame 3, a principal measurement is carried out such that the feeler 5 is controlled to fit the V-shaped groove 4 on the basis of the inclination of the lens frame 3 obtained above. Likewise, the configuration of the other lens frame 3' is measured. This measuring method is desirable for accurate measurement.

When the feeler 5 is moved along the groove 4, the feeler 5 is also moved in the direction of a Z-axis (direction perpendicular to the measurement reference surface 1) because of the inclination of the lens frames 3, 3' with respect to the surface 1. The minimum height $h_{min}$ and maximum height $h_{max}$ of the lens frame 3 in that direction are almost the same as those of the lens frame 3', respectively.

Accordingly, if the lens frames 3, 3' are shaped with almost the same accuracy, measurement data concerning one of the lens frames 3, 3' is available for the other lens frame.

However, in the case of a plastic eyeglass frame or an eyeglass frame having two lens frames which are shaped different from each other, configuration data obtained by mutual conversion often become different from those obtained by actual measurement. Therefore, there is need for the lens frames 3, 3' to be individually measured, but much time is consumed in the individual measurement.

Another problem is as follows. As shown in FIGS. 20(a) and 20(b), when the lens frames 3, 3' of the eye glass frame 2 are set on the surface 1, the lower parts 3a, 3a' of the lens frames 3, 3' close to the bridge 6 come into contact with the surface 1, so that the V-shaped grooves of the parts 3a, 3a' become parallel to the surface 1. Therefore, the feeler 5 is initialized to be first brought into contact with the V-shaped groove of the part 3a or 3a' when the measurement of a frame configuration is started.

The engagement of the feeler 5 with the V-shaped groove 4 is easily carried out in this manner if the lens frames 3, 3' of, for example, a metallic eyeglass frame 2 are almost uniform in thickness (thickness t in the up and down directions in FIG. 20(c)) and further the bottom of the V-shaped groove 4 is always positioned in the middle of the thickness t, as shown by the arrow A in FIG. 20(c).

However, in a plastic eyeglass frame, as shown by the arrow B in FIG. 20(c), the bottom of the groove 4 is often positioned apart from the middle of the thickness t and, in addition, the lens frames 3, 3' are not formed uniform in thickness.

In this case, the feeler 5 initialized to be inserted into the V-shaped groove 4 parallel to the surface 1 cannot be engaged with the groove 4 of the part 3a or 3a', hence measuring the configuration of the lens frames 3, 3' inaccurately. For this reason, heretofore, the feeler 5 has been manually engaged with the V-shaped groove 4 for the measurement.

In this connection, the following experimentation result was obtained. That is, even in the case of a plastic eyeglass frame or an eyeglass frame having two lens frames which are sized different from each other, in other words, even in the case of an eyeglass frame in which a relatively big difference is found between respective data obtained by preliminarily measuring the configurations of the right and left lens frames 3, 3', the minimum height $h_{min}$ and maximum height $h_{max}$ in the direction of the Z-axis of the feeler 5 in the right lens frame 3 are almost the same as those in the left lens frame 3', respectively, and further a difference between the heights $h_{min}$ and $h_{max}$ obtained by principal measurement is almost the same as that obtained by the preliminary measurement.

SUMMARY OF THE INVENTION

It is therefore a first object of the present invention to provide a frame configuration measuring method and apparatus in which an inclination of the front (lens frames) of an eyeglass frame with respect to a measurement reference surface is calculated from three-dimensional frame configuration data obtained by preliminary measurement so that the measurement of a frame configuration can be accurately carried out according to the inclination.

Further, it is a second object of the present invention to provide a frame configuration measuring method and apparatus capable of easily engaging a measuring means with a V-shaped groove of a lens frame.

To achieve the first and second objects, a frame configuration measuring method according to the present invention comprises a first step of bringing a feeler as a measuring means into contact with a V-shaped groove of each of lens frames of an eyeglass frame held by a frame holding means and moving the feeler along the V-shaped groove so as to obtain radius vector information ($_\varnothing\rho_n$, $_\varnothing\theta_n$) about the V-shaped groove and obtain height data $Z_n$ in the direction of a Z-axis relative to the radius vector information ($_\varnothing\rho_n$, $_\varnothing\theta_n$) and, as a result, obtain three-dimensional lens frame configuration information ($_\varnothing\rho_n$, $_\varnothing\theta_n$, $Z_n$); a second step of calculating an inclination $\theta$ of the lens frame from the maximum and minimum of the height data $Z_n$; and a third step of, if the inclination $\theta$ exceeds a given angle $\beta$, again obtaining height data $Z_n$ in the direction of the Z-axis relative to the radius vector information ($_\varnothing\rho_n$, $_\varnothing\theta_n$) and obtaining new three-dimensional lens frame configuration information ($_\varnothing\rho_n$, $_\varnothing\theta_n$, $Z_n$) by adjusting the frame holding means so as to make the inclination $\theta$ smaller than the given angle $\beta$.

To achieve the objects, a frame configuration measuring apparatus according to the present invention comprises an apparatus body, frame holding means, driving means, measuring means, and an arithmetic and control circuit. The apparatus body is provided with a measurement reference surface. The frame holding means is movably fixed to the apparatus body and simultaneously holds right and left lens frames of an eyeglass frame. The driving means drives and inclines the frame holding means with respect to the reference surface. The measuring means measures coordinates of each point in radial directions of the V-shaped groove of each lens frame of the eyeglass frame with respect to the reference surface. The arithmetic and control circuit calculates an inclination of the V-shaped groove with respect to the reference surface from a result obtained by the measuring means.

In the arithmetic and control circuit, the inclination of the V-shaped groove of one of the lens frames with respect to the reference surface is calculated from preliminary configuration data about the V-shaped groove obtained by the measuring means and, based on the inclination, the driving means is controlled to incline the frame holding means while the measuring means measures true configuration data about the lens frame.

Further, it is a third object of the present invention to provide a frame configuration measuring method and apparatus capable of quickly measuring a frame configuration by employing difference data between true lens frame configuration data about one of lens frames (lens frame configuration data obtained by principal measurement) and lens frame configuration data about the same obtained by preliminary measurement for the amendment of frame configuration data about the other lens frame and omitting a part of a measurement process of the other lens frame.

To achieve the third object, a frame configuration measuring method according to the present invention comprises a first step of bringing a feeler as a measuring means into contact with a V-shaped groove of one of lens frames of an eyeglass frame held by a frame holding means and moving the feeler along the V-shaped groove so as to obtain radius vector information ($_\varnothing\rho_n$, $_\varnothing\theta_n$) about the V-shaped groove and obtain height data $Z_n$ in the direction of a Z-axis relative to the radius vector information ($_\varnothing\rho_n$, $_\varnothing\theta_n$) and, as a result, obtain first provisional three-dimensional lens frame configuration information ($_\varnothing\rho_n$, $_\varnothing\theta_n$, $Z_n$) about the lens frame; a second step of calculating an inclination $\theta$ of the lens frame from the maximum and minimum of the height data $Z_n$; a third step of, if the inclination $\theta$ exceeds a given angle $\beta$, again obtaining height data $Z_n$ in the direction of the Z-axis relative to the radius vector information ($_\varnothing\rho_n$, $_\varnothing\theta_n$) and obtaining first true three-dimensional lens frame configuration information ($_\varnothing\rho_n'$, $_\varnothing\theta_n$, $Z_n$) by adjusting the frame holding means so as to make the inclination $\theta$ smaller than the given angle $\beta$; a fourth step of bringing the feeler into contact with a V-shaped groove of the other one of the lens frames and moving the feeler along the V-shaped groove so as to obtain radius vector information ($_\varnothing\rho_n$, $_\varnothing\theta_n$) about the V-shaped groove and obtain height data $Z_n$ in the direction of the Z-axis relative to the radius vector information ($_\varnothing\rho_n$, $_\varnothing\theta_n$) and, as a result, obtain second provisional three-dimensional lens frame configuration information ($_\varnothing\rho_n$, $_\varnothing\theta_n$, $Z_n$) about the other lens frame; a fifth step of calculating a radius vector information difference $\Delta\rho_n$ ($\Delta\rho_n=\rho_n'-\rho_n$) per rotation angle $\theta_n$ from the first provisional three-dimensional lens frame configuration information ($_\varnothing\rho_n$, $_\varnothing\theta_n$, $Z_n$) and the first true three-dimensional lens frame configuration information ($_\varnothing\rho_n'$, $_\varnothing\theta_n$, $Z_n$); and a sixth step of obtaining second true three-dimensional lens frame configuration information (($_\varnothing\rho_n+\Delta\rho_n$), $_\varnothing\theta_n$, $Z_n$) by adding the radius vector information difference $\Delta\rho_n$ to a radius vector $\rho_n$ per rotation angle $\theta$ of the second provisional three-dimensional lens frame configuration information ($_\varnothing\rho_n$, $_\varnothing\theta_n$, $Z_n$) obtained in the fourth step.

To achieve the third object, a frame configuration measuring apparatus according to the present invention comprises an apparatus body, frame holding means, driving means, measuring means, and an arithmetic and control circuit. The apparatus body is provided with a measurement reference surface. The frame holding means is movably fixed to the apparatus body and simultaneously holds right and left lens frames of an eyeglass frame. The driving means drives and inclines the frame holding means with respect to the reference surface. The measuring means measures coordinates of each point in radial directions of a V-shaped groove of each lens frame of an eyeglass frame with respect to the reference surface. The arithmetic and control circuit calculates an inclination of the V-shaped groove with respect to the reference surface from a result obtained by the measuring means.

In the arithmetic and control circuit, the inclination of the V-shaped groove of one of the lens frames with respect to the reference surface is calculated from provisional configuration data about the V-shaped groove obtained by the measuring means and, based on the inclination, the driving means is controlled to incline the frame holding means while the measuring means measures true amended configuration data about the lens frame. Thereafter, the measuring means measures provisional configuration data about a V-shaped groove of the other one of the lens frames and then a difference between the amended configuration data and the provisional configuration data about the other lens frame is added to the provisional configuration data about the other lens frame in order to obtain true configuration data about the other lens frame.

BRIEF DESCRIPTION OF THE DRAWINGS

FIG. 11 is an exploded view of the feeler and the feeler supporting members shown in FIGS. 9 and 10.

FIG. 12(a) is a top view, partially in cross section, of the feeler and the feeler supporting members of FIG. 9; FIG. 12(b) is a side view of the same; FIG. 12(c) is a left-side view of FIG. 12(b); and FIG. 12(d) is a sectional view taken along line A—A of FIG. 12(a).

DESCRIPTION OF THE PREFERRED EMBODIMENT

One embodiment of the present invention will be hereinafter described with reference to the attached drawings.

Figure 1:
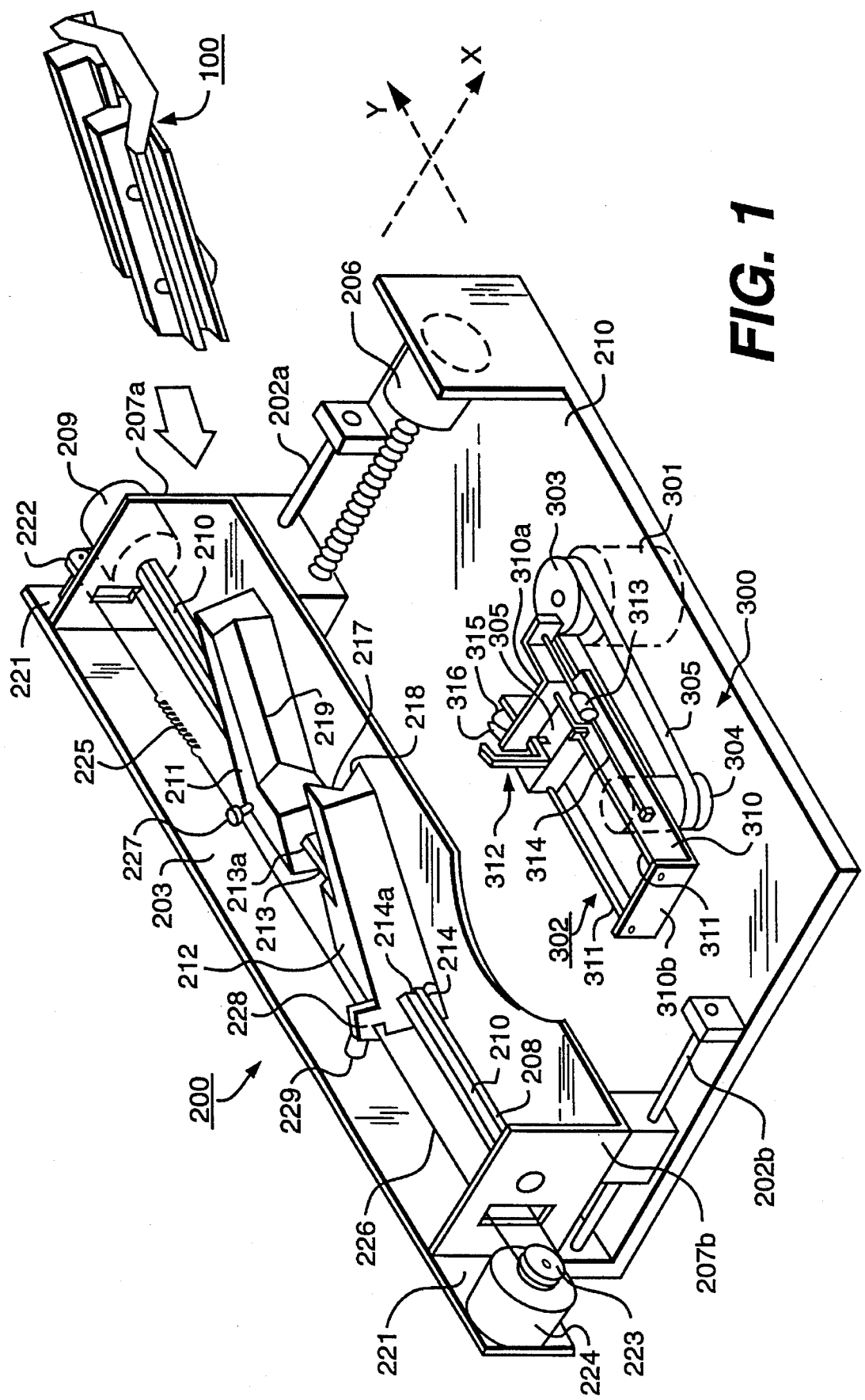
FIG. 1 is a perspective view showing a frame configuration measuring apparatus according to the present invention.

FIG. 1 is a perspective view showing a frame configuration measuring apparatus according to the invention. The frame configuration measuring apparatus is constituted of three major parts. One part is a frame holder (frame holding means) 100 for simultaneously holding right and left lens frames of an eyeglass frame, another part is a supporting device 200 for supporting and moving the frame holder 100 into a measuring plane within which the frame holder 100 is further adjusted by the device 200, and still another part is a measuring portion (measuring means) 300 for digitally measuring the configuration of the lens frame or a template of the lens frame.

As shown in FIGS. 2 to 5, the frame holder 100 has a fixed base 150 and flanges 151, 151 formed on both sides 151a, 151a of the fixed base 150. A pair of frame holding bars 152, 152 are each secured to the flanges 151, 151 by means of a screw at an interval in a longitudinal direction. The pair of bars 152, 152 are placed on the same axis and opposite to each other with a space between.

A movable base 153 having sides 153a, 153a is inserted between a bottom plate 150a of the fixed base 150 and the flanges 151. The movable base 153 is supported by two leaf springs 154, 154 which are mounted on the bottom plate 150a.

Two parallel guide grooves 155, 155 are formed in the movable base 153. Projections 156a, 156a of sliders 156, 156 are engaged with the guide grooves 155, 155 such that the sliders 156, 156 can slide on the movable base 153.

Circular openings 157, 157 are formed in longitudinal sides of the movable base 153, and each of rings 158, 158 is rotatably fitted in the periphery of each of the openings 157, 157. Two pins 159, 159 are mounted on the upper surfaces of the rings 158, 158, respectively. The pins 159, 159 are inserted into slots 156c, 156c formed in stepped portions 156b, 156b of the sliders 156, 156, respectively.

Further, hollows 156d, 156d through which the frame holding bars 152, 152 are inserted are formed in the sliders 156, 156. Holes 156e, 156e are formed in the upper surface of the sliders 156, 156 in order to help an operator to move the sliders with the operator's fingers in the holes.

Referring again to FIG. 1, a casing 201 of the supporting device 200 has guide rails 202a, 202b which are disposed on the casing 201 in parallel with each other in the direction of the X-axis of a measurement coordinate system. A movable stage 203 is slidably mounted on the guide rails 202a, 202b. A female screw portion 204 into which an X-axis feed screw 205 is screwed is formed under the movable stage 203. The X-axis feed screw 205 is turned by an X-axis motor 206 consisting of a pulse motor.

A guide shaft 208 is stretched between flanges 207a, 207b of the movable stage 203 in parallel with the Y-axis of the measurement coordinate system. The guide shaft 208 can be rotated by a guide shaft motor (rotating and driving means) 209 mounted on the flange 207a. A line of guide groove 210 is formed on the guide shaft 208 in parallel with the shaft 208. A measuring reference surface SO is defined by a horizontal plane including the central line of the guide shaft 208.

Hands 211, 212 are supported by the guide shaft 208 and are slid in the longitudinal direction. Projections 213a, 214a are formed on the inner surfaces of bores 213, 214 of the hands 211, 212, respectively. The projections 213a, 214a are engaged with the guide groove 210 of the guide shaft 208, thereby preventing the hands 211, 212 from rotating about the guide shaft 208.

Figure 8:
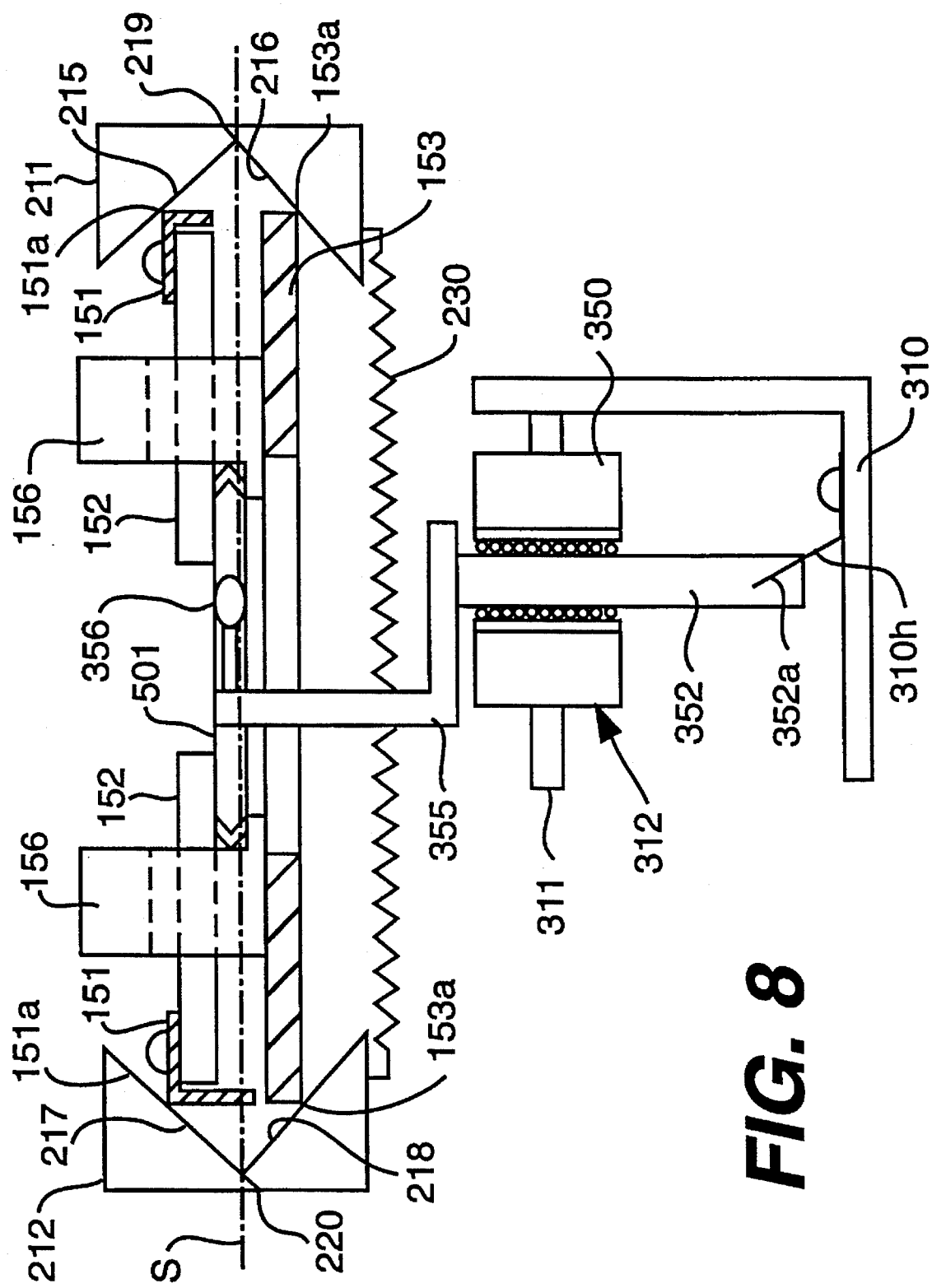
FIG. 8 is a sectional view showing the relationship between the supporting device and the sensor portion shown in FIG. 7.

The hand 211 has two inclined surfaces 215, 216 crossing each other, and likewise, the other hand 212 has two inclined surfaces 217, 218 crossing each other. An edge 220 common to the inclined surfaces 217, 218 is formed in parallel with and in the same plane as an edge 219 common to the inclined surfaces 215,216. Further, an angle formed by the inclined surfaces 217, 218 is equal to that formed by the inclined surfaces 215, 216. As shown in FIG. 8, a spring 230 is stretched between the hands 211, 212.

According to the above arrangement, the frame holder 100 is set between the hands 211, 212 and then the guide shaft 208 is rotated by the guide shaft motor 209, so that the hands 211, 212 and the frame holder 100 are inclined upward and downward with respect to the reference surface SO.

A pulley 222 is rotatably supported by one end of a back flange 221 of the movable stage 203, and a Y-axis motor 224 having a pulley 223 is mounted on the other end of the back flange 221. A miniature belt 226 one part of which is a spring 225 is laid between the pulleys 222, 223. Each end of the miniature belt 226 is secured to a pin 227 perpendicularly provided on the upper surface of the hand 211. On the other hand, a flange 228 is formed on the upper surface of the hand 212, and according to the movement of the hand 212, the flange 228 is brought into contact with one end of a pin 229 projecting from the back flange 221 of the movable stage 203.

The measuring portion 300 as a measuring means constitutes of a sensor-arm rotating motor 301, a sensor arm section 302, a pulley 303, a rotating shaft 304 of the sensor arm section 302, and a belt 305. The sensor-arm rotating motor 301 is mounted on the backside of the casing 201. The sensor arm section 302 is rotatably supported on the upper surface of the casing 201. The pulley 303 is mounted on the rotating shaft of the motor 301. The belt 305 is stretched between the pulley 303 and a rotating shaft 304 of the sensor arm section 302, thereby transmitting the rotation of the motor 301 to the sensor arm section 302.

The sensor arm section 302 is constitutes of a base 310, two rails 311, 311, a sensor head section 312, a magnetic scale read head 313, a magnetic scale 314, and a spring device 315. The base 310 has erect plates 310a, 310b at each short side end of the base 310. The rails 311, 311 are stretched between the plates 310a, 310b and in parallel with each other. The sensor head section 312 is laid on the rails 311, 311 slidably in the longitudinal direction. The magnetic scale read head 313 is mounted on one side of the sensor head section 312. The magnetic scale 314 is disposed on the base 310 in parallel with the rails 311, 311. The spring device 315 constantly pulls the sensor head section 312 toward one side of the end of the arm section 302. The magnetic scale read head 313 reads the magnetic scale 314 to detect the amount of movement of the sensor head section 312.

Figure 6:
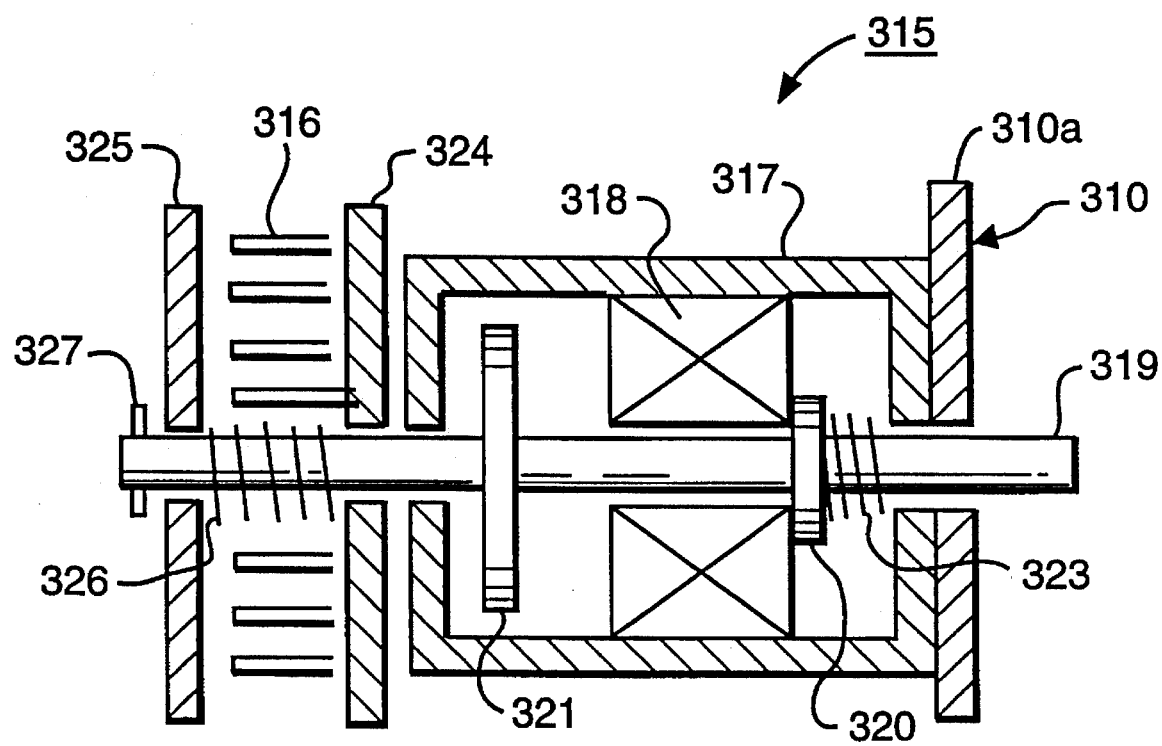
FIG. 6 is a sectional view of a spring member shown in FIG. 1.

FIG. 6 shows one example of the construction of the spring device 315. The spring device 315 includes a casing 317, an electromagnet 318, and a slide shaft 319. The casing 317 is mounted on the plate 310a of the base 310. The electromagnet 318 is disposed within the casing 317. The slide shaft 319 is inserted into the axis bore of the electromagnet 318 slidably in the direction of the axis of the shaft 319. The slide shaft 319 extends in the direction perpendicular to the rail 311.

The slide shaft 319 has flanges 320, 321, and a tension spring 323 is fitted on a part of the shaft 319 which is defined between the flange 320 and the inner wall of the casing 317, so that the slide shaft 319 is constantly pushed leftward as shown in FIG. 6.

Clutch plates 324, 325 are rotatably supported by the other end of the slide shaft 319. A flat spiral spring 316 enclosing a part of the shaft 319 is disposed between the clutch plates 324, 325. One end of the flat spiral spring 326 is secured to the clutch plate 324, whereas the other end thereof is secured to the sensor head section 312 so as to push the section 312 toward the plate 310a. A compression spring 326 is fitted on the part of the slide shaft 319 between the clutch plates 324 and 325, so that the clutch plates 324, 325 are constantly spaced apart so as to prevent the flat spiral spring 316 from coming in contact with the clutch plate 325. In addition, a washer 327 is mounted on the end of the slide shaft 319.

Figure 9:
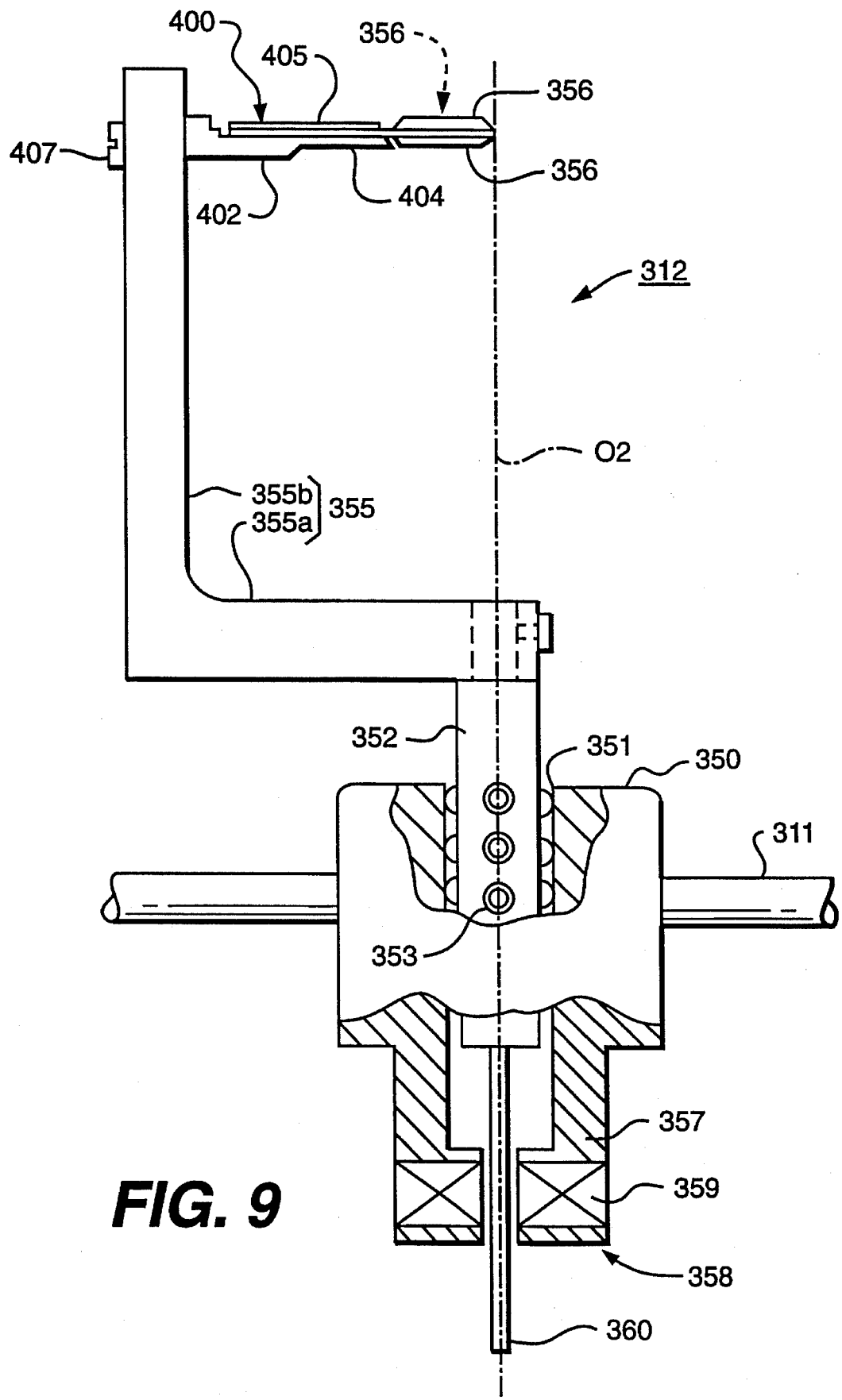
FIG. 9 is a front view, partially in cross section, showing the sensor portion.

Referring now to FIG. 9, the sensor head section 312 has a slider 350 supported by the rail 311 movably in the longitudinal direction. An axis bore 351 is vertically formed in the slider 350. A sensor shaft 352 is inserted into the bore 351. The sensor shaft 352 holds ball bearings 353 between the sensor shaft 352 and the bore 351, thereby smoothly rotating about the vertical axis of the shaft 352 and traveling in the direction of the vertical axis thereof.

An L-shaped arm 355 is mounted on the upper end of the sensor shaft 352. The L-shaped arm 355 consists of a horizontal arm part 355a one end of which is secured to the sensor shaft 352 and a vertical arm part 355b integral with the horizontal arm part 355a. A feeler 356 is held by a feeler holding means 400 fixed to the upper end of the vertical arm part 355b.

Figure 10:
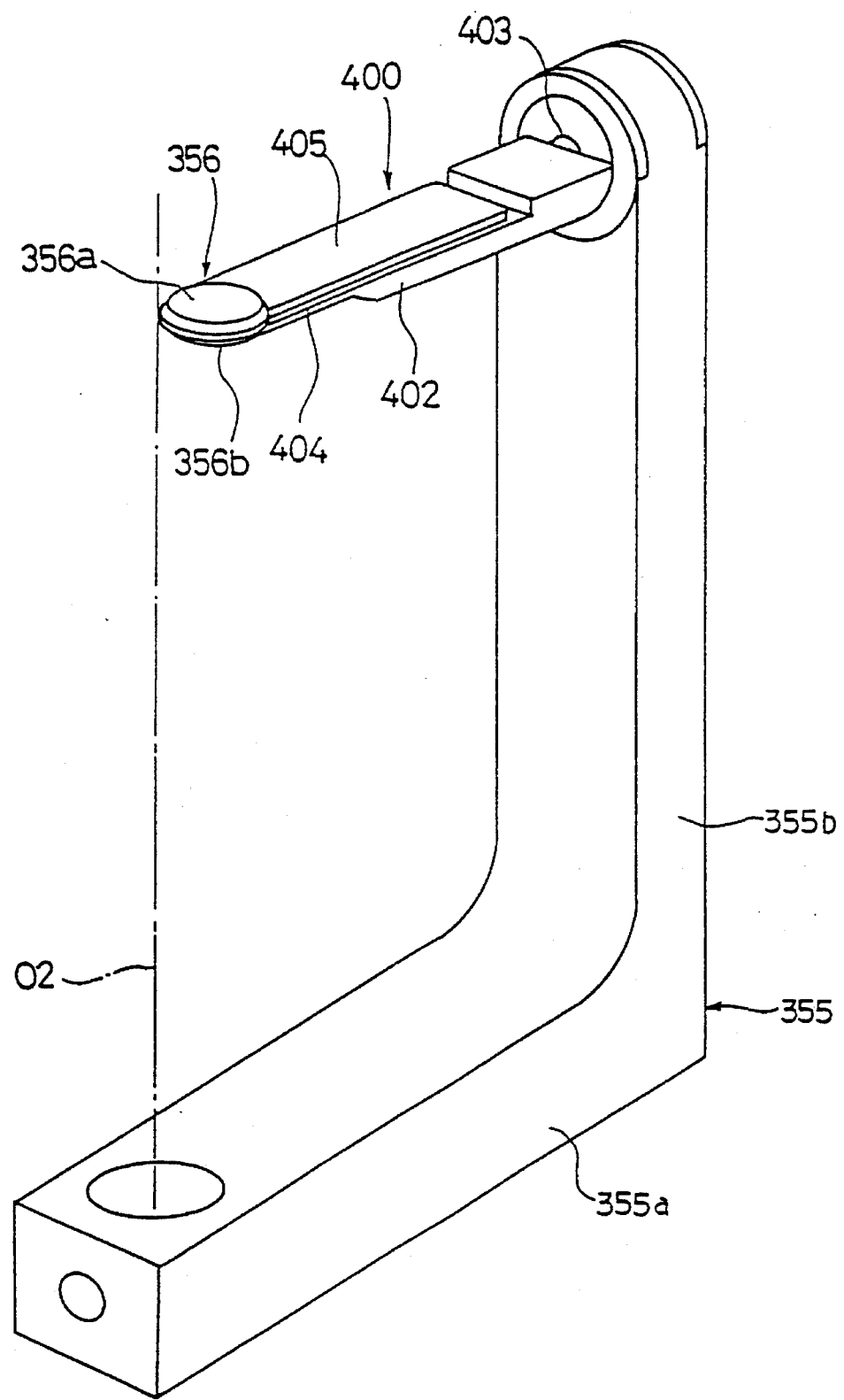
FIG. 10 is a perspective view showing a feeler and feeler supporting members shown in FIG. 9.

As shown in FIGS. 10 to 12, the feeler holding means 400 constitutes of a plate member 402 extending in the same direction as the horizontal arm part 355a, a rotating shaft 403 integral with the plate member 402, a spring plate 404 fastened to the surface of the plate member 402, and a presser plate 405 fastened to the surface of the spring plate 404.

As shown in FIGS. 12(a) and 12(b), a mounting hole 355c is formed in the upper end of the vertical arm part 355b. Ring-shaped bearings 406, 406 having flanges 406a, 406a are fitted in the mounting hole 355c. A rotating shaft 403 is fitted between the bearings 406, 406, and a securing screw 407 is inserted into the rotating shaft 403. Rotating parts 406b, 406b of the bearings 406, 406 are maintained between the securing screw 407 and the end of the plate member 402. The axis 01 of the rotating shaft 403 is parallel with the reference surface SO and is perpendicular to the axis 02 of the sensor shaft 352.

As shown in FIGS. 11 and 12(d), the feeler 356 consists of feeler members 356a, 356b each trapezoid-shaped in section and disposed with the end part of the spring plate 404 there between. A shaft projection 356c is formed at the center of the feeler member 356a, and a projection receiving hole 356d is formed at the center of the feeler member 356b. Further, a hole 408 is formed in the end part of the spring plate 404.

The shaft projection 356c passes through the hole 408 of the spring plate 404 and is fitted in the receiving hole by slight pressure, so that the feeler 356 is rotatably held by the end part of the spring plate 404. The apex of the feeler 356 is disposed on the axis line (center line) 02 of the sensor shaft 352.

As shown in FIG. 9, a sensor 358 for detecting the movement of the sensor shaft 352 in the vertical direction, i.e., in the direction of the Z-axis, is disposed between the lower end of the slider 350 and the lower end of the sensor shaft 352. The sensor 358 constitutes of a read head 359 placed in the lower part of the slider 350 and a magnetic scale 360 fastened to the lower end of the sensor shaft 352.

As shown in FIG. 8, pins 352a, 352a projecting in a direction perpendicular to that of the horizontal arm part 355a are formed integrally with the lower part of the magnetic scale 360. The pins 352a, 352a are brought into contact with a plate-spring hanger 310h fixed to a base 310, so that the arm 355 and the feeler 356 follow the direction in which the slider 350 is moved.

Figure 13:
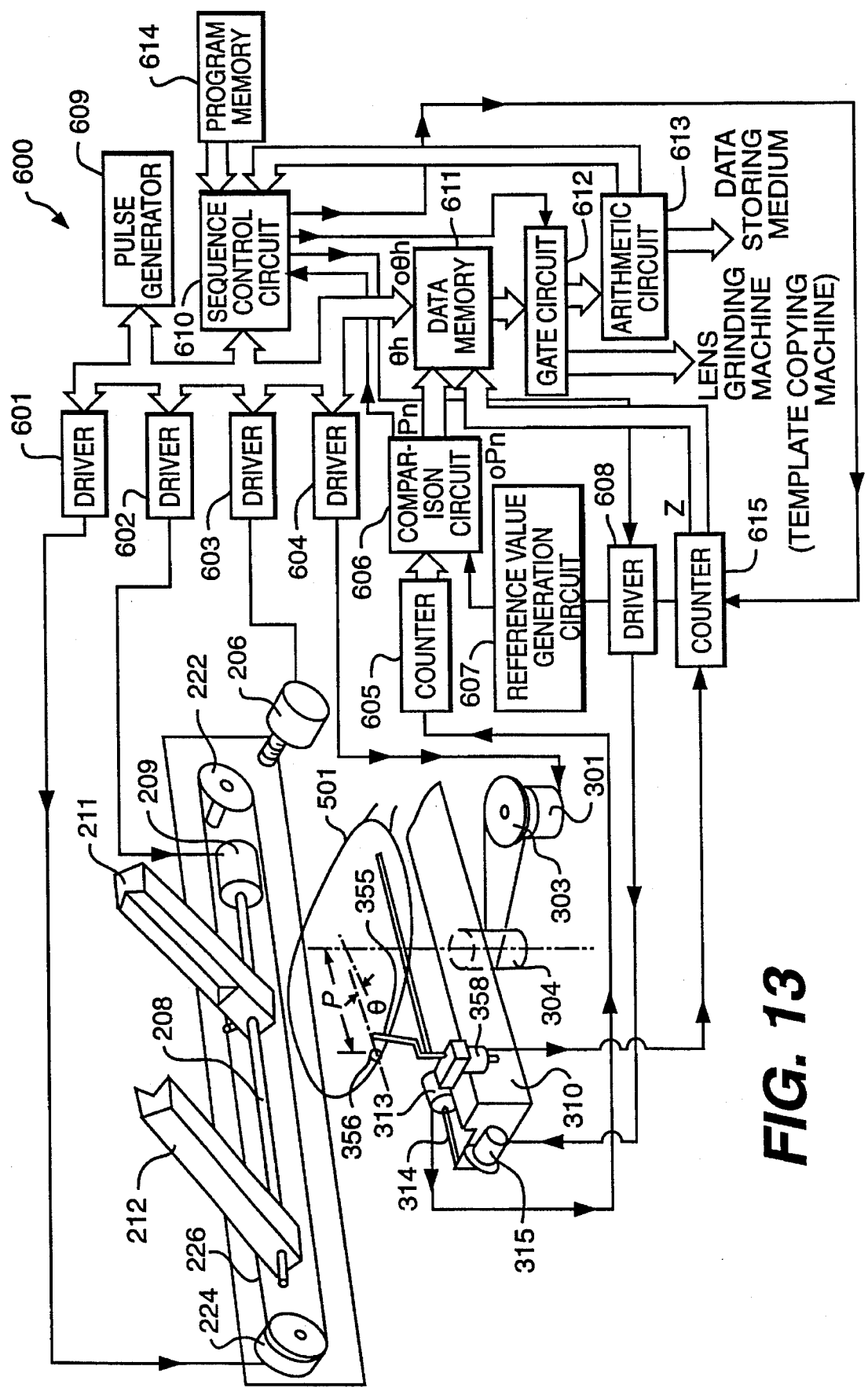
FIG. 13 is a control circuit of the frame configuration measuring apparatus shown in FIGS. 1 to 12.

The frame configuration measuring apparatus is controlled by an arithmetic and control circuit 600 shown in FIG. 13.

A description will be hereinafter given of the operations of the lens holder 100 and the frame configuration measuring apparatus controlled by the arithmetic and control circuit 600.

Figure 2:
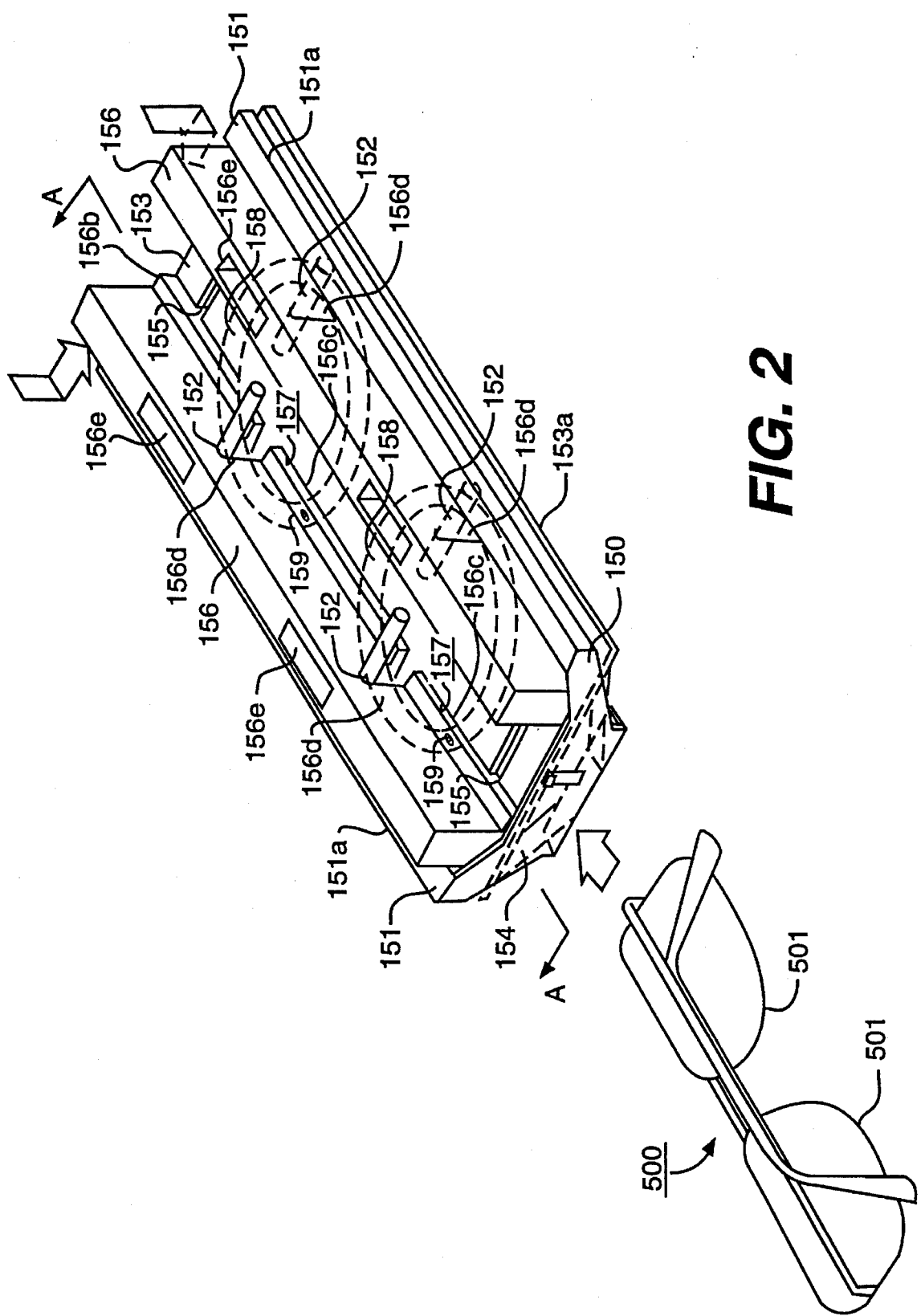
FIG. 2 is a perspective view showing the relationship between a frame holder and an eyeglass frame.
Figure 3:
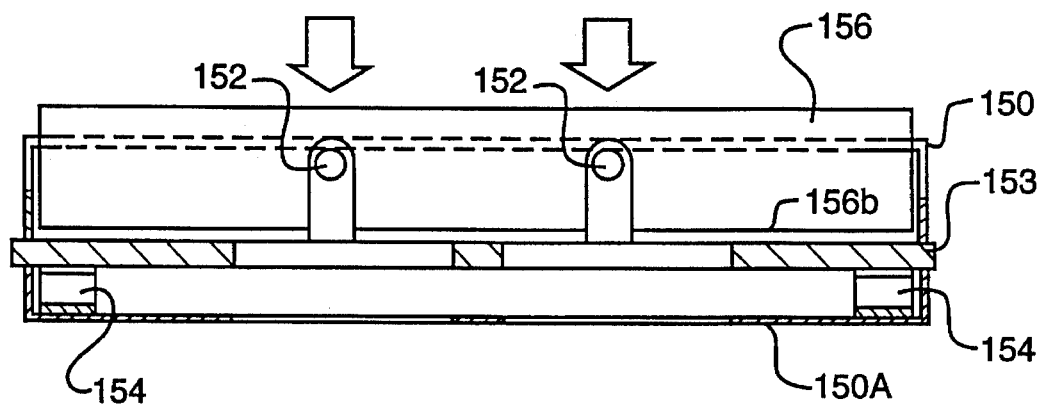
FIG. 3 shows the operation of the frame holder shown in FIGS. 1 and 2.

Fingers are first inserted into the holes 156e, 156e of the sliders 156, 156 shown in FIG. 2, and then force is applied to sufficiently widen the distance between the sliders 156, 156, while pressing the sliders 156, 156 downward against the resilience of the leaf springs 154, 154. That is, the sliders are changed from the state shown in FIG. 5 to that shown in FIG. 3. Thereby, sufficient spaces are provided between the frame holding bars 152, 152 and the stepped portions 156b, 156b of the sliders 156, 156. After that, lens frames 501, 501 of an eyeglass frame 500 are inserted into the space, and the distance between the sliders 156, 156 is narrowed such that the upper and lower parts of the lens frames are kept, in contact with the inner walls of the sliders 156, 156.

According to this embodiment, the sliders 156, 156, as mentioned above, are coupled with the rings 158, 158, and therefore, when one of the sliders 156, 156 travels a certain distance, the other slider 156 also travels a distance equivalent to that of the former.

Figure 4:
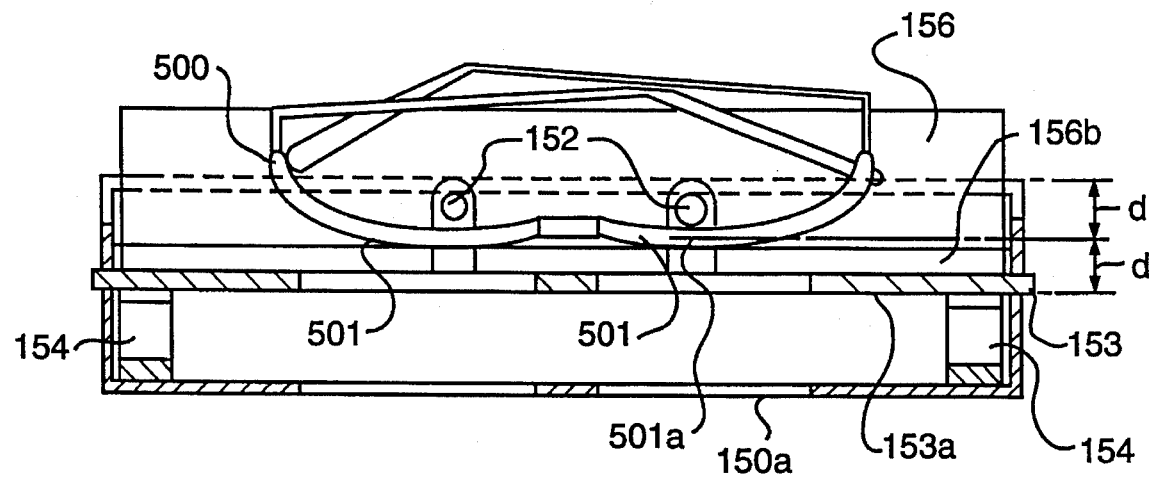
FIG. 4 shows the eyeglass frame held by the frame holder.
Figure 5:
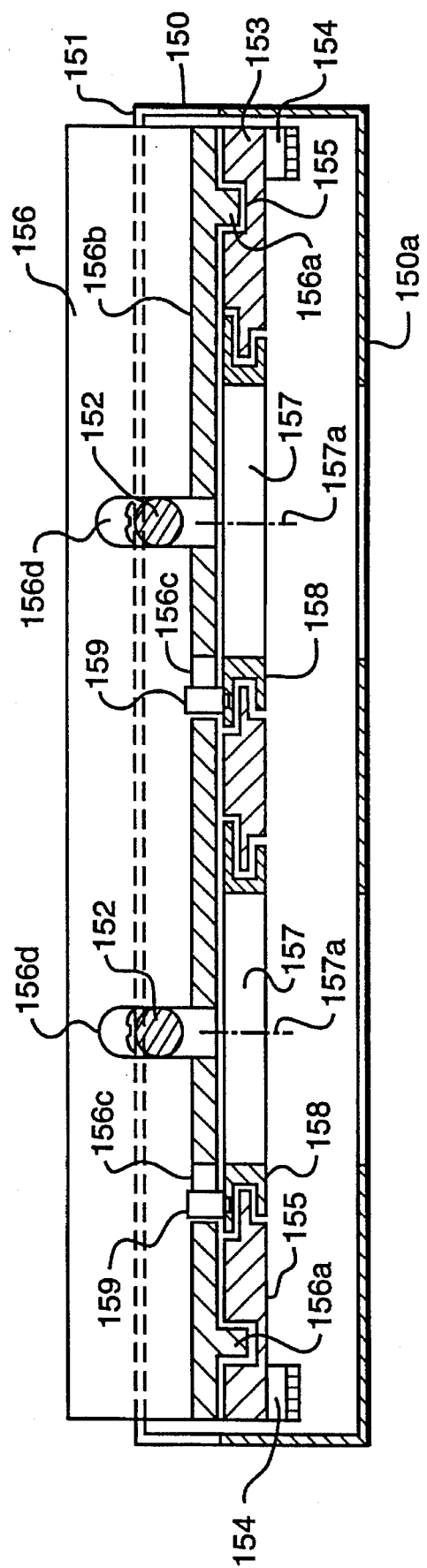
FIG. 5 is a sectional view taken along line A—A of FIG. 2.
Figure 7:
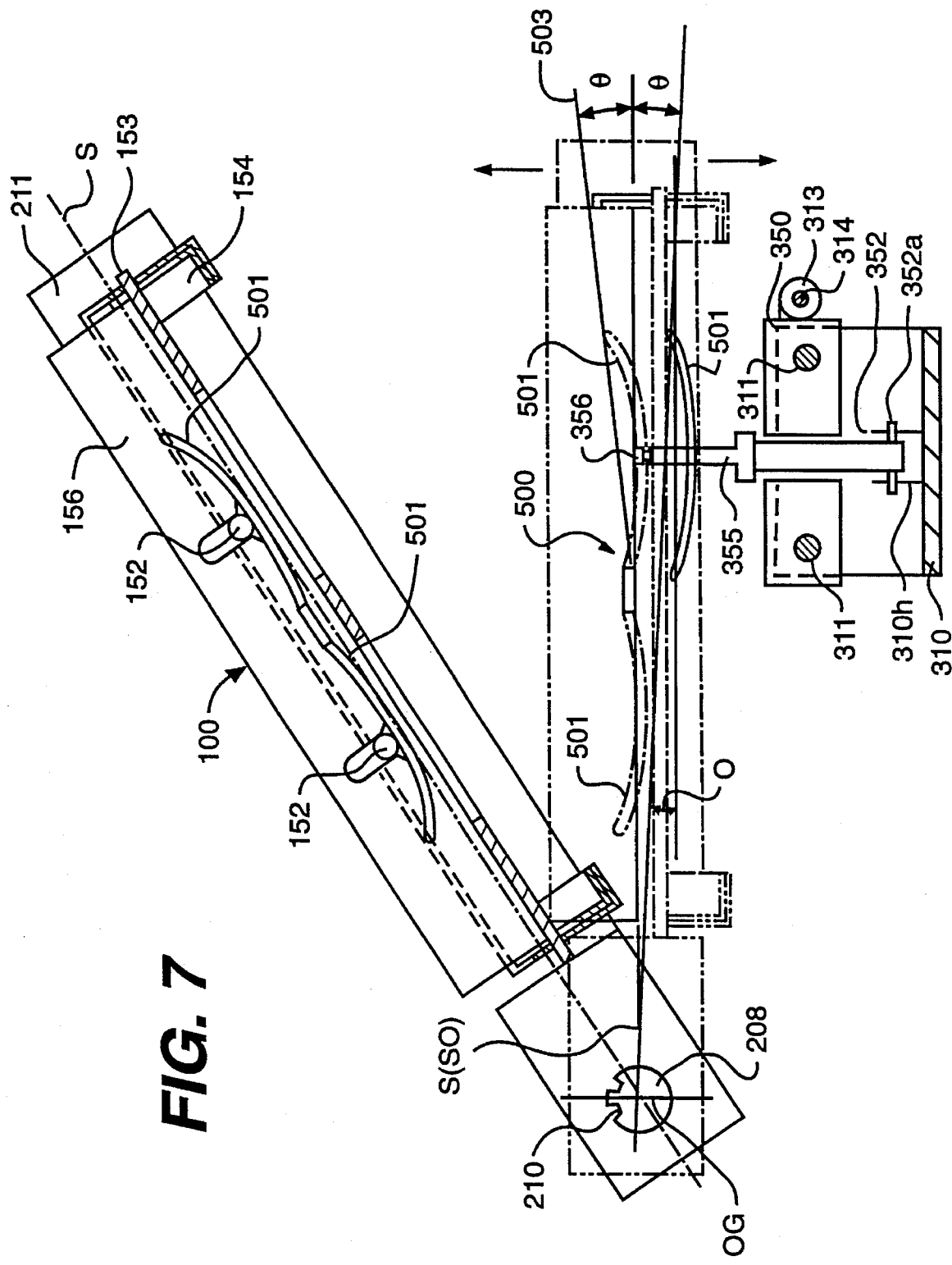
FIG. 7 schematically shows a supporting device and a sensor portion shown in FIG. 1.

Next, the eyeglass frame 500 is slid such that the substantial center of the upper part of the lens frame 501 is positioned under the holding bar 152. Subsequently, when the operator releases the fingers from the sliders 156, 156, the movable frame 153 is pushed upward by the resiliency of the leaf springs 154, 154 and, as shown in FIGS. 4 and 7, the lens frames 501, 501 are clamped between the stepped portions 156b, 156b and the holding bars 152, 152.

At this time, the eyeglass frame 500 is retained such that the substantial geometrical centers of the lens frames 501, 501 approximately coincide with the center lines 157a, 157a of the circular openings 157, 157 of the frame holder 100. Further, a distance d between the bottom (apex) 501a of the V-shaped groove (bevel groove) of the lens frame 501 and the side 151a of the flange 151 of the fixed base 150 is equal to a distance d between the bottom 501a and the side 153a of the movable base 153.

Next, the frame holder 100 holding the frame 500 is inserted into a predetermined space between the hands 211, 212 of the supporting device 200, and then the Y-axis motor 224 is rotated by a predetermined angle. The rotation of the Y-axis motor 224 drives the miniature belt 226 and the hand 211 is caused to travel leftward by a fixed distance. Simultaneously, the frame holder 100 and the hand 212 are caused to travel leftward, so that the flange 228 is released from the pin 229.

At the same time, the frame holder 100 is clamped, as shown in FIG. 8, between the hands 211, 212 by means of the pulling spring 230. At this time, the sides 151a, 151a of the flanges 151, 151 of the fixed base of the frame holder 100 are respectively brought into contact with the inclined surface 215 of the hand 211 and the inclined surface 217 of the hand 212, and the sides 153a, 153a of the movable base 153 are respectively brought into contact with the inclined surface 216 of the hand 211 and the inclined surface 218 of the hand 212.

According to the preferred embodiment of the present invention, since the distance d between the bottom (apex) 501a of the V-shaped groove 502 of the lens frame 501 and the side 151a is the same as the distance d between the apex 501a and the side 153a, when the frame holder 100 is clamped between the hands 211 and 212 in the case of, for example, a metallic eyeglass frame in which the bottom 501a of the V-shaped groove 502 is positioned at the center of the thickness of the lens frames 501, 501, an automatic coincidence is brought about between the bottom 501a and a reference plane S defined by the combined edges 219, 220 of the hands 211, 212.

When the bottom 501a of the groove 502 is located in the reference plane S, if the left lens frame 501 of the eyeglass frame 500 held by the frame holder 100 is placed on the side of the guide shaft 208, the feeler 356 is positioned under the circular opening 157 facing the left lens frame 501.

Thereafter, when the guide shaft rotating motor 209 is rotated downward by a predetermined angle to turn the frame holder 100 to the position indicated by the alternate long and two short dashes line (phantom line) in FIG. 7, the feeler 356 is inserted into the left lens frame 501 held by the frame holder 100 through the opening 157 and, at the same time, the reference plane S of the frame holder 100 stops flush with the initial position (measuring reference surface SO) of the feeler 356 of the measuring portion 300.

The Y-axis motor 224 is further rotated so that the hands 211, 212 holding the frame holder 100 may be caused to travel a predetermined distance in the direction of the Y-axis until the center line 157a of the circular opening 157 of the frame holder 100 substantially coincides with the axis of the rotating shaft 304 of the measuring portion 300.

While the hands 211, 212 are traveling, the feeler 356 is brought into contact with the V-shaped groove 502 of the left lens frame 501.

As shown in FIGS. 7 and 8, the direction of travel of the feeler 356 is initially restricted since the pin 352a projecting from the lower end portion of the sensor shaft 352 is arranged to come in contact with the hanger 310a mounted on the base 310 of the sensor arm section 302. Therefore, when the eyeglass frame 500 is caused to travel by the rotation of the Y-axis motor 224, the feeler 356 is always engaged with the V-shaped groove 502.

The movement of the feeler 356 to the left lens frame 501 is also brought about by the motors 224, 209, etc. controlled by the arithmetic and control circuit 600.

Figure 14:
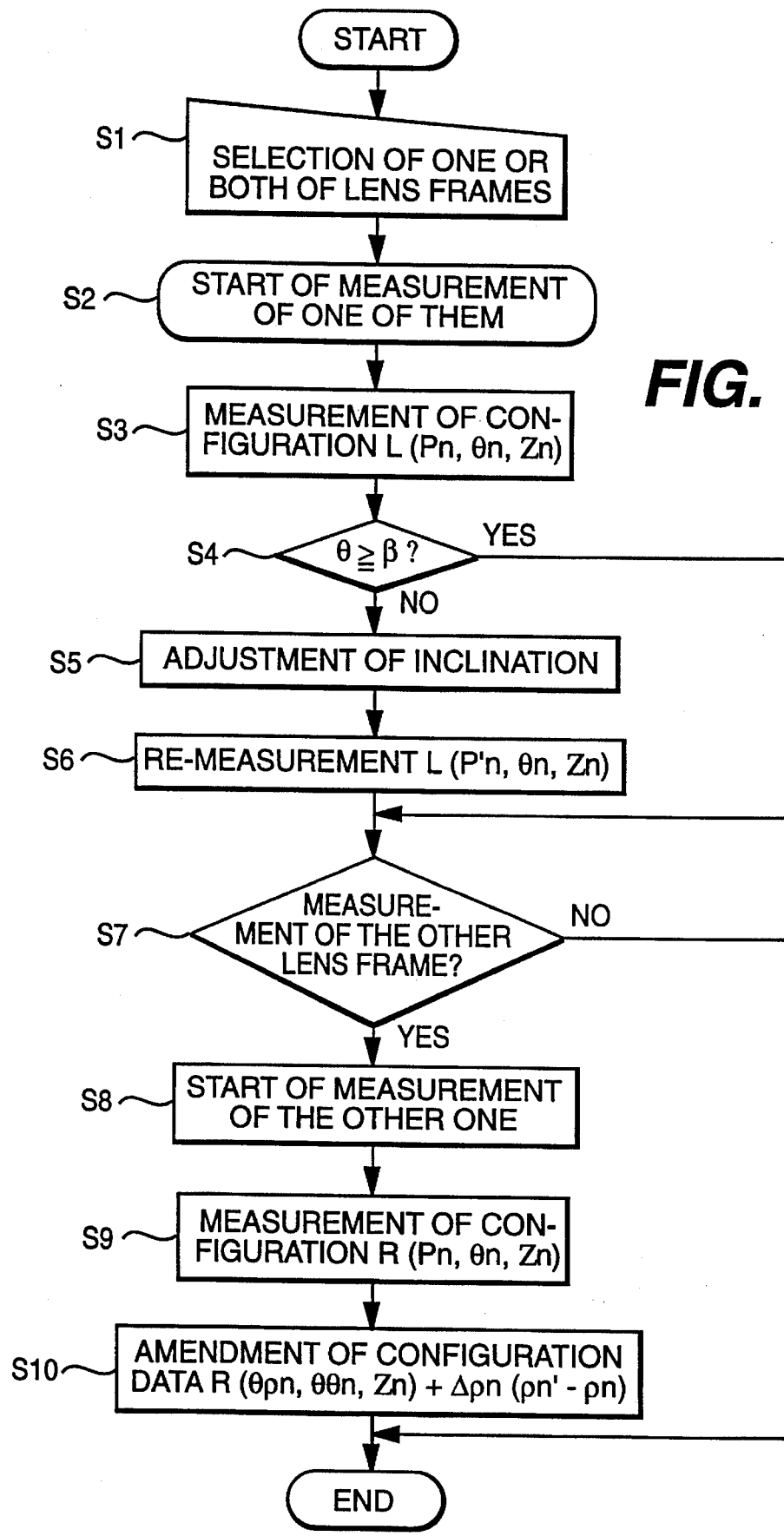
FIG. 14 is a flow chart showing a sequence of operations of the control circuit of FIG. 13.

When the frame holder 100 holding the eyeglass frame 500 is inserted between the hands 211 and 212 and then the feeler 356 is brought into contact with the V-shaped groove 502 of the left lens frame 501 in such a way as described above, the arithmetic and control circuit 600 begins operation for the measurement of the configuration of the lens frames 501, 501 in accordance with steps 1 through 10 shown in FIG. 14.

Step 1

In step 1, a selecting key (selecting switch), not shown, is operated to determine whether both lens frames are measured or one of the lens frames is measured. After that, the process proceeds to step 2.

Step 2

The arithmetic and control circuit 600 controls the rotation of the motor 301 and begins the measurement of the configuration of the left one 501 of the lens frames 501, 501 of the eyeglass frame 500. In order to obtain configuration data (provisional measurement configuration data) about the lens frame 501 in three dimensional directions, the process proceeds to step 3.

Step 3

Figure 17A:
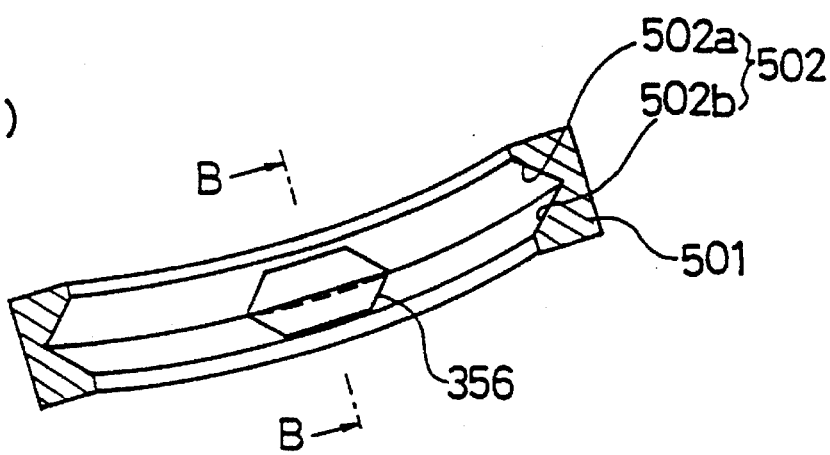
FIG. 17(a) shows a feeler brought into contact with a V-shaped groove of the lens frame, FIG. 17 (b) is a sectional view taken along line B—B of FIG. 17(a), and 17(c) shows the lens frame and a lens ground according to lens frame configuration data obtained by the frame configuration measuring apparatus.
Figure 17B:
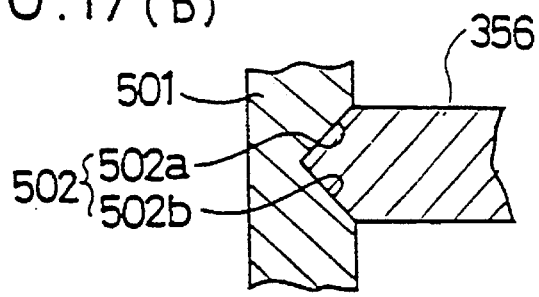

Under the control of the rotation of the motor 301 by the arithmetic and control circuit 600, the feeler 356 rotates around the axis line 02 of the sensor shaft 352, while moving along the V-shaped groove 502. When moving, the feeler 356 receives force from the inclined surfaces of the V-shaped groove 502 in a direction in which the V-shaped groove 502 extends, so that the feeler holding means 400 and the rotating shaft 403 are rotated on the axis line 01 by the bearings 406, 406. As a result, the feeler 356 is inclined as shown in FIG. 17(a) in the direction in which the V-shaped groove 502 extends and is completely engaged with the V-shaped groove 502 as shown in FIG. 17(b). In FIG. 17(b), the detailed construction of the feeler 356 is not shown for convenience.

On the other hand, the arithmetic and control circuit 600 causes the motor 301 to rotate in every rotating pulses of unit rotation which is predetermined.

Figure 15:
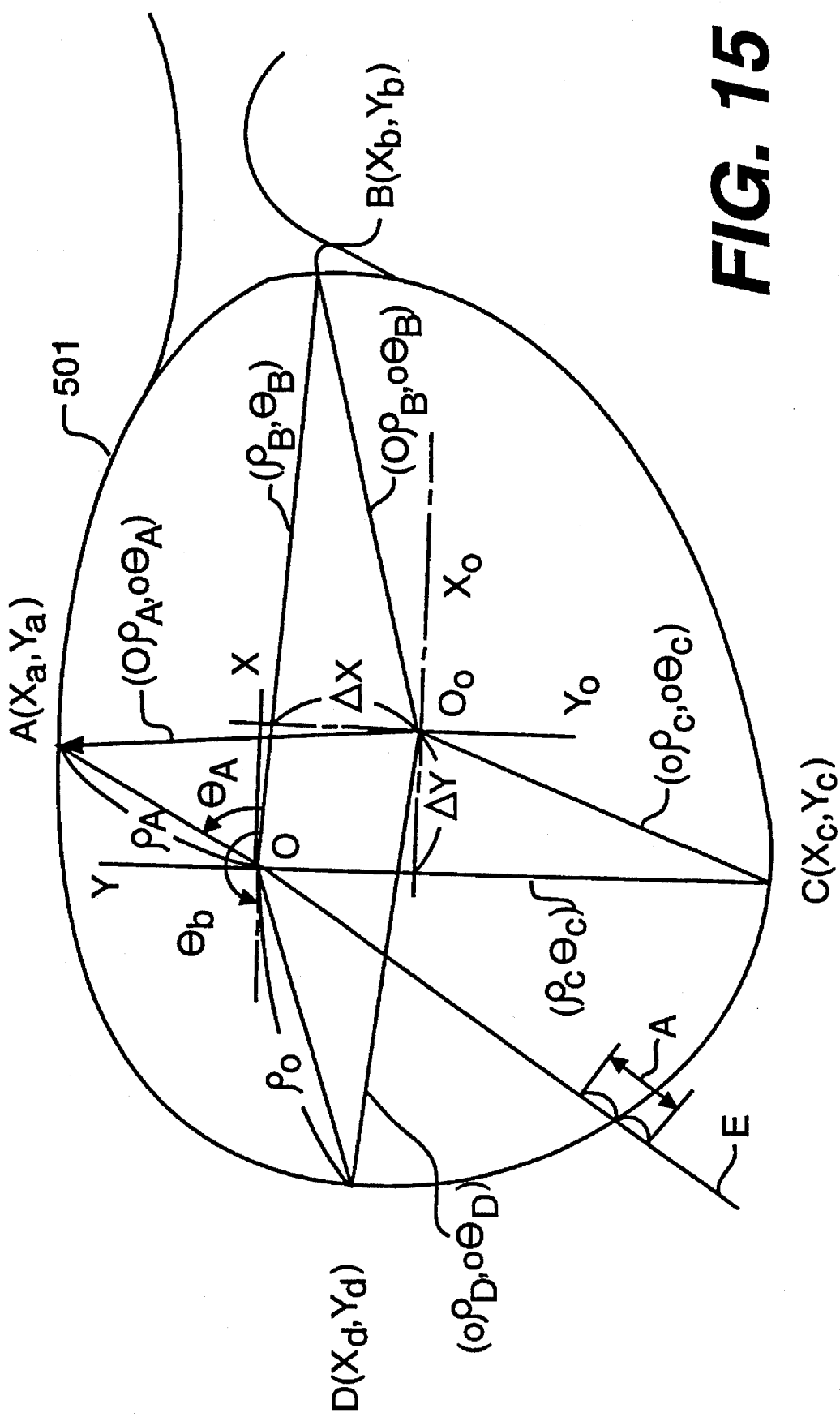
FIG. 15 is a diagrammatical view for calculating the geometrical center of a lens frame from measured values of the lens frame.

By the rotation of the motor 301, the sensor head section 312 slides on the rails 311,311 in accordance with the shape of the eyeglass frame 500, in other words, in accordance with the radius-vectors of the lens frame 501. The distance of travel of the sensor head section 312 is read by the magnetic scale 314 and the read head 313. The configuration of the lens frame 501 is measured in the form of L ($\rho_n$, $\theta_n$)(n=1, 2, 3, ... N) based on the angle $\theta$ of rotation of the motor 301 and the angle $\rho$ read by the read head 313. As shown in FIG. 15, this measurement is carried out in a state in which the axis O of the rotating shaft 304 substantially coincides with the geometrical center of the lens frame 501.

Thereafter, based on data ($X_n$, $Y_n$) obtained by the transformation of the data L ($\rho_n$, $\theta_n$) from polar to rectangular coordinates, the following points are selected: a point B ($X_b$, $Y_b$) to be measured showing the maximum value in the direction of the X-axis; a point D ($X_d$, $Y_d$) to be measured showing the minimum value in the direction of the X-axis; a point A ($X_a$, $Y_a$) to be measured showing the maximum value in the direction of the Y-axis; and a point C ($X_c$, $Y_c$) to be measured showing the minimum value in the direction of the Y-axis. Based on the values, the geometrical center $O_o$ of the lens frame 501 is determined according to the following equation:

$$O_o(X_o, Y_o) = \{(X_b+X_d)/2, (Y_a+Y_c)/2\} \quad (1)$$

Subsequently, a measured value R ($_{\varnothing}\rho_n$, $_{\varnothing}\theta_n$) (n=1, 2, 3, ... N) of the geometrical center $O_o$ is calculated by the arithmetic and control circuit 600. Based on the values $X_o$ and $Y_o$, the X-axis motor 206 and the Y-axis motor 224 are driven to move the frame holder 100 clamped between the hands 211, 212, thereby causing the geometrical center $O_o$ of the lens frame 501 to coincide with the rotating axis O of the sensor arm section 302. The configuration of the lens frame 501 is again measured to obtain a measured value R ($_{\varnothing}\rho_n$, $_{\varnothing}\theta_n$) of the geometrical center $O_o$.

Simultaneously with the measurement of the lens frame based on the geometrical center $O_o$, the quantity of movement of the sensor head section 312 in the direction of the Z-axis is measured by the sensor 358. As a result, three-dimensional information (provisional measurement configuration data) ($_{\varnothing}\rho_n$, $_{\varnothing}\theta_n$, $Z_n$) (n=1, 2, 3, ... N) about the lens frame 501 are obtained as first provisional information about the lens frame 501.

In case the feeler 356 comes off the lens frame 501 during measurement, an allowable range (variable range) a of deviation of a radius vector is predetermined as shown by the line e of FIG. 15 because radius vector data obtained when disconnected therefrom become greatly different from the data obtained by the immediately preceding measurement. When a departure from the allowable range a is detected, the rotation of the sensor arm section 302 is stopped and, at the same time, the electromagnet 318 of the spring device 315 shown in FIG. 6 is excited, and thereby the flange 321 is attracted thereto.

Consequently, since the clutch plates 324, 325 squeeze the flat spiral spring 316 and stop the winding action of the spring 316 the arm 355 of the sensor head section 312 catches on the lens frame 501. This prevents the frame 500 from receiving damage and, in addition, the feeler 356 and the arm 355 of the sensor head section 312 from being deformed or broken. When the feeler 356 comes off the lens frame 501, the eyeglass frame 500 is put back to the initial position to measure the configuration of the lens frame 501 again.

FIG. 13 is a block diagram of the arithmetic and control circuit 600 of the frame configuration measuring apparatus according to the present invention. Driver circuits 601, 602, 603, and 604 are connected to the Y-axis motor 224, the guide shaft rotating motor 209, the X-axis motor 206, and the sensor-arm rotating motor 301, respectively. The driver circuits 601 to 604 are controlled by a sequence control circuit 610, while they control the rotation of each pulse motor in accordance with the number of pulses supplied from a pulse generator 609.

The quantity of movement of the magnetic scale read head 313 is calculated by a counter 615 and then is input to a comparison circuit 606. The comparison circuit 606 compares the variation of a value from the counter 615 with a signal corresponding to the allowable range a supplied from a reference value generation circuit 607. If the variation is within the range a, the value $\rho_n$ calculated by the counter 605 and the number of pulses supplied from the pulse generator 609 are transformed into a rotation angle $\theta$ of the L-shaped arm 355, and then data L ($\rho_n$, $\theta_n$) are input to a data memory 611 to store the data.

A detailed description will now be given of the operation of the arithmetic and control circuit 600 performed when data $Z_n$ in the direction of the Z-axis are obtained relative to the data L ($\beta_n$, $\theta_n$).

The sequence control circuit 610 switches the gate circuit 612 to an arithmetic circuit 613 and then, based on the data L ($\beta_n$, $\theta_n$) stored in the data memory 611, causes the arithmetic circuit 613 to calculate the geometrical center $O_o$ of the lens frame 501. The resultant data are input to the sequence control circuit 610. Based on the data from the arithmetic circuit 613, the sequence control circuit 610 locates the values $X_o$ and $Y_o$ from the equation (1) and inputs the number of required pulses to the driver circuits 601, 603 to drive the motors 224, 206. Thereby, the geometrical center $O_o$ of the lens frame 501 is caused to coincide with the rotating axis O of the sensor arm section 302.

At the same time, the sequence control circuit 610 commands the counter circuit 615 to count data supplied from the Z-axis sensor 358, and then lens frame configuration information ($_{\varnothing}\rho_n$, $_{\varnothing}\theta_n$, $Z_n$) including the data in the direction of the Z-axis are stored in the data memory 611. If the value $\rho_n$ or $_\phi\rho_n$ from the counter 605 exceeds the variable radius vector range a output by the reference value generation circuit 607, the comparison circuit 606 outputs a signal of the excess to the sequence control circuit 610. When receiving this signal, the sequence control circuit 610 actuates the driver circuit 608 to excite the electromagnet 318 of the spring device 315. As a result, the movement of the feeler 336 is stopped and, at the same time, the supply of pulses to the driver circuit 604 is shut off so as to stop the rotation of the motor 301.

Figure 17C:
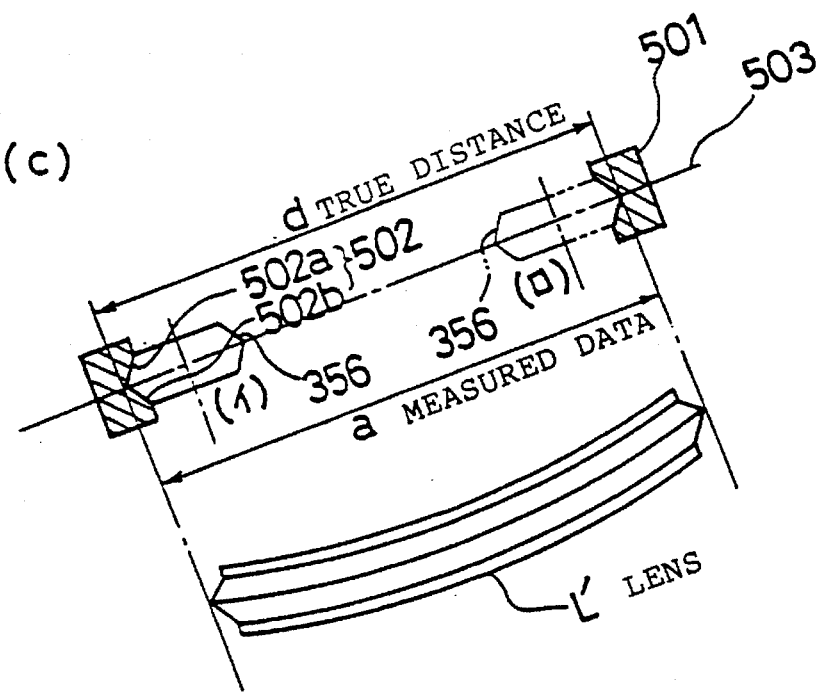
Figure 18:
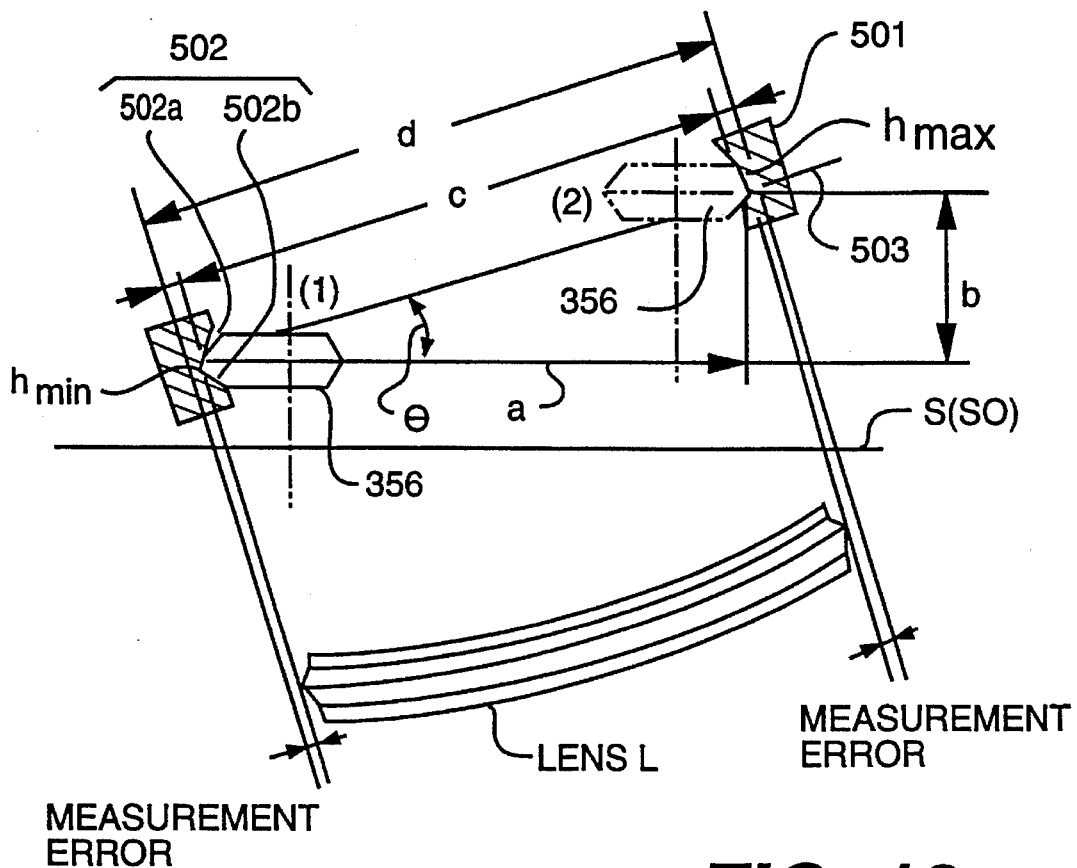
FIG. 18 is a descriptive drawing showing the preliminary measurement of the lens frame carried out by the frame configuration measuring apparatus of FIG. 1.
Figure 19:
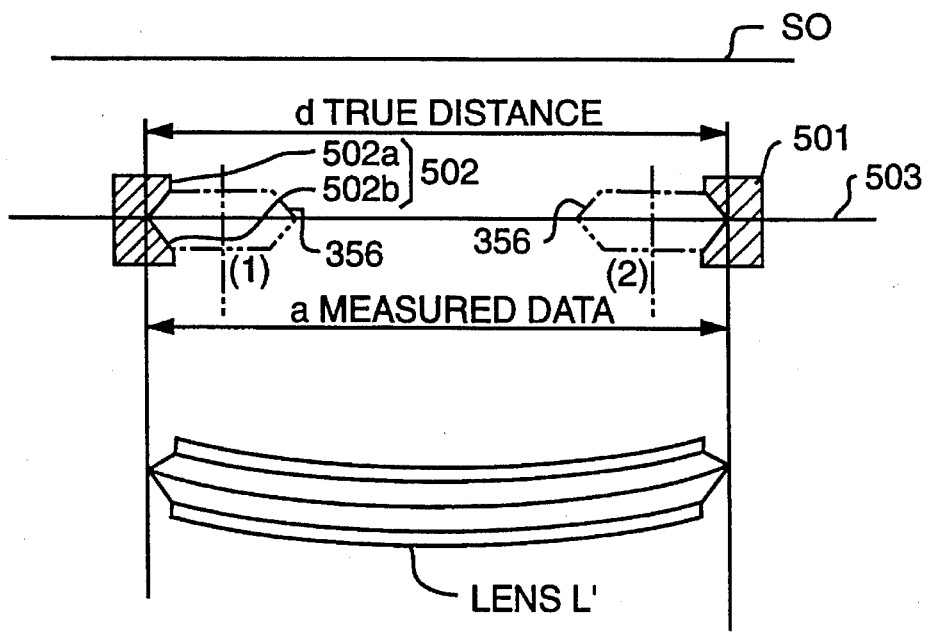
FIG. 19 is a descriptive drawing showing the principal measurement of the lens frame by the frame configuration measuring apparatus.

In the measurement mentioned above, since the lens frame 501 is inclined as shown in FIGS. 7, 17, and 18, an angle θ of inclination is formed between the center line 503 of the V-shaped groove 502 and the measuring reference surface SO in the upper and lower parts of the lens frame 501, as shown in FIG. 18. For this reason, the feeler 356 cannot be brought into contact with the bottom of the V-shaped groove 502, and therefore the feeler 356 is kept in contact with the slope 502a or 502b.

Therefore, in the above-mentioned measurement, it is impossible to accurately measure the distance d (d≠c=(a²+b²)^{1/2}) between the upper and lower parts of the lens frame 501. The distance therebetween obtained in fact is c which is smaller than d by 2Δd.

In order to eliminate this error, the arithmetic and control circuit 600 calculates an angle θ of inclination in step 4, amends the angle θ if the angle θ exceeds a predetermined angle β in step 3, and takes an accurate measurement in step 5.

Step 4

In step 4, based on the minimum ($h_{min}$) and the maximum ($h_{max}$) of the height $Z_n$ from the reference surface SO among the lens frame configuration information ($_\phi\rho_n$, $_\phi\theta_n$, $Z_n$) obtained above, the arithmetic and control circuit 600 calculates an angle θ of inclination of the lens frame 501 shown in FIGS. 7, 17, and 18, in other words, an angle θ of the center line 503 by which $h_{min}$ and $h_{max}$ of the V-shaped groove 502 shown in FIG. 18 are connected to each other with respect to the reference surface SO. After that, the arithmetic and control circuit 600 determines whether the angle θ exceeds the predetermined angle β (for example, 5°) or not. If the angle θ is below the angle β, the process proceeds to step 7 without taking steps 5 and 6. On the other hand, if the angle θ exceeds the angle θ, the process proceeds to step 5 to adjust the inclination and then proceeds to step 6 to take a measurement again.

As mentioned above, the arithmetic and control circuit 600 operates to proceed to step 7 without taking step 5 if the angle θ is below a fixed degree such as 5°. In that case, the lens frame configuration information ($_\phi\rho_n$, $_\phi\theta_n$, $Z_n$) are stored as data about a provisionally measured configuration of the left lens frame 501 to form a judgment in step 7.

The angle θ can be obtained according to the following equation:

$$\tan \theta = b/a$$

where a is the quantity of movement of the feeler 356 in the right and left directions and b is the quantity of movement of the feeler 356 in the direction of the Z-axis.

Step 5

The arithmetic and control circuit 600 controls the motor 209 to control the rotation of the guide shaft 208, thereby rotating the frame holder 100 and the eyeglass frame 500 together with the hands 211, 212 by the angle θ downward and stopping them. In the stopping position, the center line 503 of the lens frame 501 becomes parallel with a plane including the apex of the feeler 356, and thereby the angle θ becomes smaller than the angle β. Accordingly, d and a shown in FIG. 18 become equal to each other.

Step 6

When an alteration to the inclination of the lens frame 501 is completed, the arithmetic and control circuit 600 operates to obtain lens frame configuration information L ($_\phi\rho_n'$, $_\phi\theta_n$, $Z_n$) which is corrected configuration data (first true lens frame configuration information) and is different from that obtained in the preceding steps, by means of the feeler 356 as in step 1. In the measurement of this step, the distance d of the V-shaped groove 502 of the lens frame 501 is accurately measured because the feeler 356 is engaged with the V-shaped groove 502 almost completely and therefore the apex of the feeler 356 is brought into contact with the bottom of the groove 502. The lens frame configuration information L ($_\phi\rho_n'$, $_\phi\theta_n$, $Z_n$) thus obtained is stored in the data memory 611. In this embodiment, the inclination only of the left lens frame 501 is altered to measure the configuration of the lens frame 501. Instead, the inclination of the center line 503 in all the points of the V-shaped groove 503 may be horizontally altered by turns, and then coordinates of each point may be determined to measure the configuration of the lens frame 501. Further, based on information about an eccentricity corresponding to a difference between the geometrical center $O_\phi$ of the lens frame 501 and the rotating axis O of the sensor arm section 302 and being input beforehand, a measurement may be taken on the assumption that the rotating axis O of the sensor arm section 302 is a sole center.

When the measurement is completed, the arithmetic and control circuit 600 reverses the guide shaft rotating motor 209 by a given angle and then rotates upward and inclines the frame holder 100 from the position indicated by the phantom line to the position indicated by the solid line in FIG. 7. After that, the feeler 356 is removed from the right lens frame 501 of the eyeglass frame 500 held by the frame holder 100 through the other circular opening 157. The process proceeds to step 7.

Step 7

If only one of the right and left lens frames is selected for measurement in step 1, the measurement is completed on the judgment that measurements taken in steps 2 through 6 are for the other lens frame.

On the other hand, if both of the right and left lens frames are selected for measurement in step 1, a judgment is formed whether measurements taken in steps 2 through 6 are for the other lens frame or not. If not so, the process proceeds to step 8 to measure the configuration of the other (right) lens frame 501.

Step 8

The arithmetic and control circuit 600 controls and drives the motor 206 so as to rotate the X-axis feed screw 205. The movable stage 203 is moved in the direction of the X-axis (in the front and back directions) by the rotation of the feed screw 205. Thereby, the feeler 356 is positioned under the circular opening 157 of the pair of openings 157, 157 which faces the right lens frame 501.

From this position, the arithmetic and control circuit 600 rotates the guide shaft rotating motor 209 by a given angle so as to rotate the frame holder 100 downward to the position indicated by the phantom line in FIG. 7. Subsequently, the feeler 356 is inserted into the right lens frame 501 of the frame 500 held by the frame holder 100 through the other circular opening 157 and, at the same time, the reference plane S of the frame holder 100 is stopped in the same plane as the initial position (measuring reference surface SO) of the feeler 356 of the measuring portion 300.

In this position, the Y-axis motor 224 is further rotated to move the hands 211, 212 holding the frame holder 100 in the direction of the Y-axis by a fixed amount. As a result, the center axis of the rotating shaft 304 coincides substantially with the center 157a of the circular opening 157 facing the right lens frame 501 of the frame holder 100.

At this time, the feeler 356 moving therealong is brought into contact with the V-shaped groove 502 of the right lens frame 501.

As shown in FIGS. 7 and 8, the initial position of the feeler 356 is restricted in direction by means of the pin 352a and the hanger 310a. Therefore, the feeler 356 can always enter the V-shaped groove 503 when the eyeglass frame 500 is moved by the rotation of the Y-axis motor 224.

When such movement of the feeler 356 into the right lens frame 501 is completed, the arithmetic and control circuit 600 controls the motor 301 to start the measurement of the right lens frame 501. The process proceeds to step 9 to obtain configuration data about the right lens frame 501 in three dimensional directions.

Step 9

The same measurement as in step 3 is carried out in step 9. Lens frame configuration information R ($_\emptyset\rho_n$, $_\emptyset\theta_n$, $Z_n$) about the right lens frame 501 is obtained as second provisional lens frame configuration information. The process proceeds to step 10 to amend the information R ($_\emptyset\rho_n$, $_\emptyset\theta_n$, $Z_n$) obtained in step 9.

Step 10

Based on L ($_\emptyset\rho_n$, $_\emptyset\theta_n$) of the lens frame configuration information L ($_\emptyset\rho_n$, $_\emptyset\theta_n$, $Z_n$) about the left lens frame 501 obtained in step 3 and L ($_\emptyset\rho_n'$, $_\emptyset\theta_n$) of the true lens frame configuration information L ($_\emptyset\rho_n'$, $_\emptyset\theta_n$, $Z_n$) about the left lens frame 501 obtained in step 6, the arithmetic and control circuit 600 calculates a difference $\Delta\rho_n$ ($\Delta\rho_n = \rho_n' - \rho_n$) of radius vector information per rotation angle $\theta_n$.

The data difference $\Delta_{92\,n}$ is added to $\rho_n$ of the lens frame configuration information R ($_\emptyset\rho_n$, $_\emptyset\theta_n$, $Z_n$) about the right lens frame 501 obtained in step 9 per rotation angle $\theta_n$. Thereby, true lens frame configuration information R [($_\emptyset\rho_n + \Delta\rho_n$), $_\emptyset\theta_n$, $Z_n$] about the right lens frame 501 is obtained and stored in the data memory 611. The measurement is completed.

By the switching of the gate circuit 612, as occasion demands, the true lens frame configuration information L ($_\emptyset\rho_n'$, $_\emptyset\theta_n$, $Z_n$) about the left lens frame 501 and the true lens frame configuration information R [($_\emptyset\rho_n + \Delta\rho_n$), $_\emptyset\theta_n$, $Z_n$] about the right lens frame 501 obtained in the above steps are supplied to, for example, a digital lens grinding machine or template copying machine, which is disclosed in Japanese Patent Application No. Sho 58-225197 (European Patent No. 0143468) which was filed by the applicant of the present invention, or to an apparatus for judging whether an eyeglass frame is shaped and sized according to predetermined design data.

From the data $Z_n$ of the lens frame configuration information L ($_\emptyset\rho_n'$, $_\emptyset\theta_n$, $Z_n$) stored in the data memory 611, the arithmetic circuit 613 can locate a curve value c when the need arises.

Figures 16A, 16B:
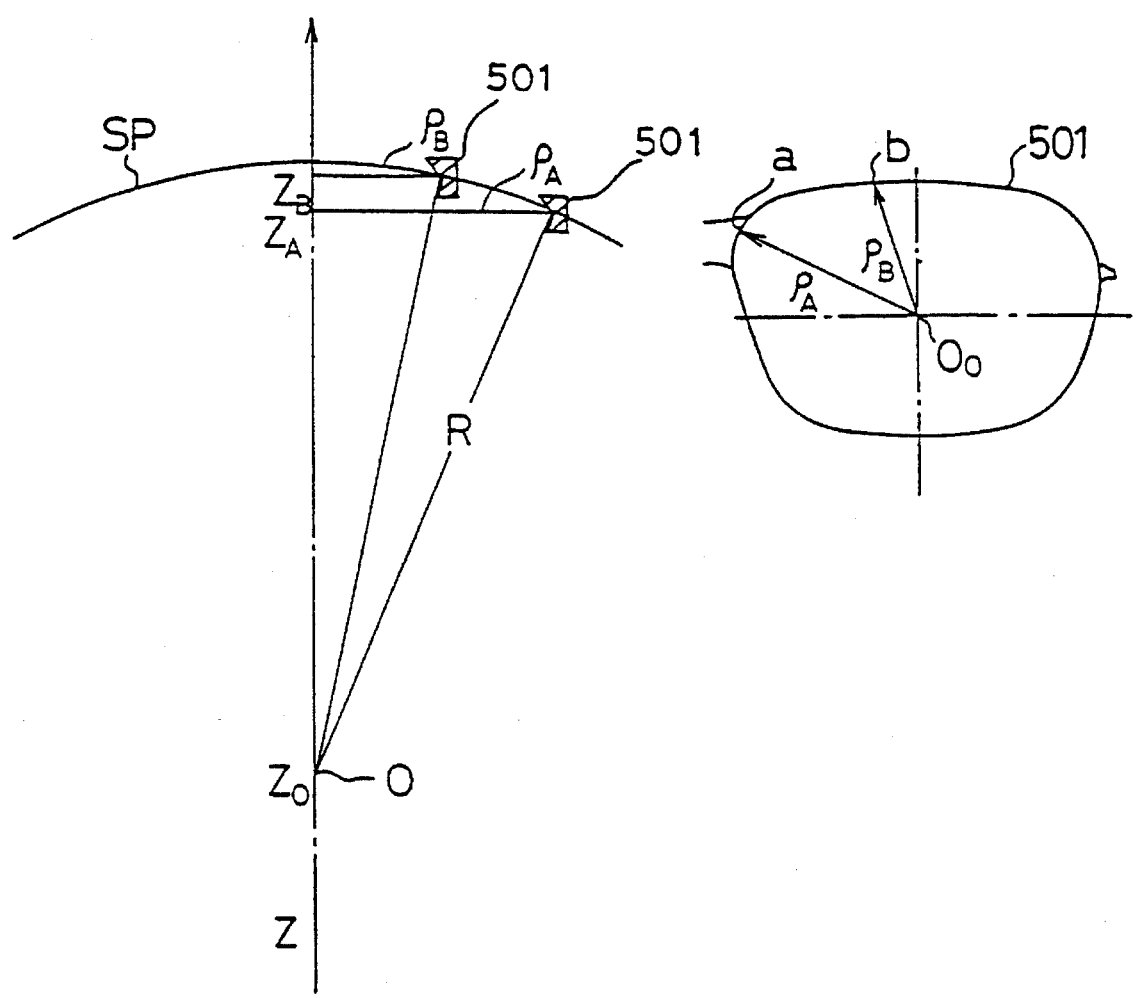
FIGS. 16(A) and 16(B) are diagrammatical views for calculating a curve value C of the lens frame.

As shown in FIGS. 16(A) and 16(B), based on radius vectors $\rho_{iA}$ and $\rho_{iB}$ of at least two points a and b of the lens frame 501 and traveling distances $Z_A$ and $Z_B$ of the points a and b in the direction of the Z-axis, respectively, the radius R of curvature of a sphere SP including the locus of the V-shaped groove 503 of the lens frame 501 is obtained according to the following equations:

$$R^2 = \rho_{iA}^2 + (Z_\emptyset - Z_A)_2$$

$$R^2 = \rho_{iB}^2 + (Z_\emptyset - Z_B)_2 \qquad (2)$$

Accordingly, the curve value c is $$C = \{(n-1)/R\}1000 \qquad (3)$$

where n is a constant (=1.523).

The sequence control circuit 610 performs the measuring steps mentioned above according to a program stored in a program memory 614.

A finished lens L' for the right or left lens frame ground according to the thus obtained data has a size substantially equal to the true distance d of the lens frame 501 shown in FIG. 17(c). In FIG. 17(c), the finished lens L' is represented slightly different in size from the distance d for convenience of illustration, but the two are formed substantially equal to each other in fact.

In order to measure the configuration of the lens frame 501 more accurately, the rotating shaft 403 may be interconnected with a rotary encoder via a pulley and a wire and thereby the arithmetic and control circuit 600 may calculate an angle of inclination of the feeler 356 in accordance with a signal input thereto from the encoder.

In this embodiment, the configuration of the left lens frame is first measured as mentioned above. Instead, the configuration of the right lens frame may be first measured and then information about the configuration of the left lens frame may be amended.

Figure 20A:
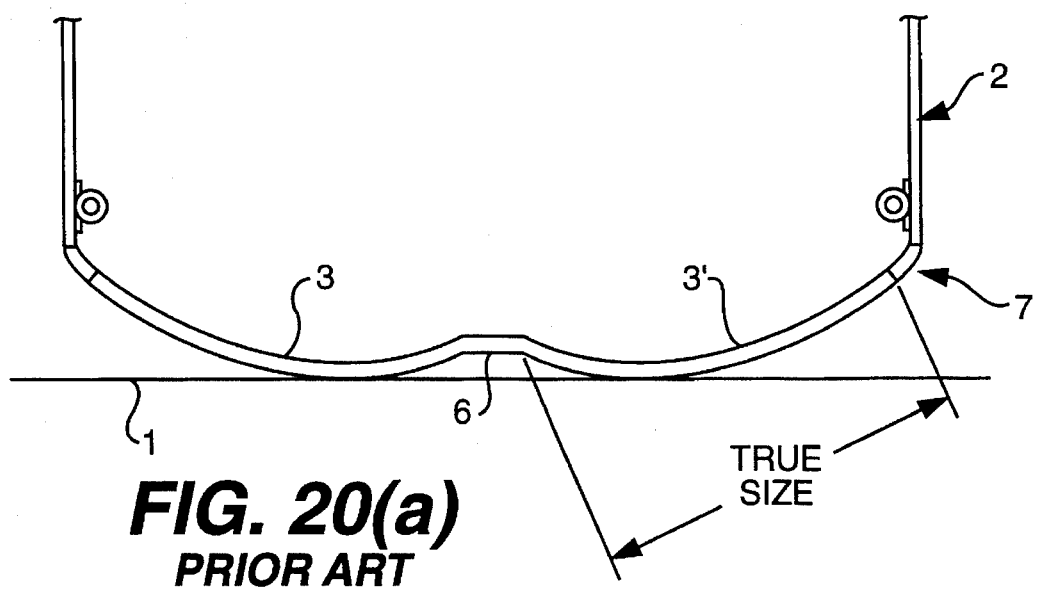
FIG. 20(a) shows the relationship between an eyeglass frame and a measurement reference surface of a conventional frame configuration measuring apparatus.
Figure 20B:
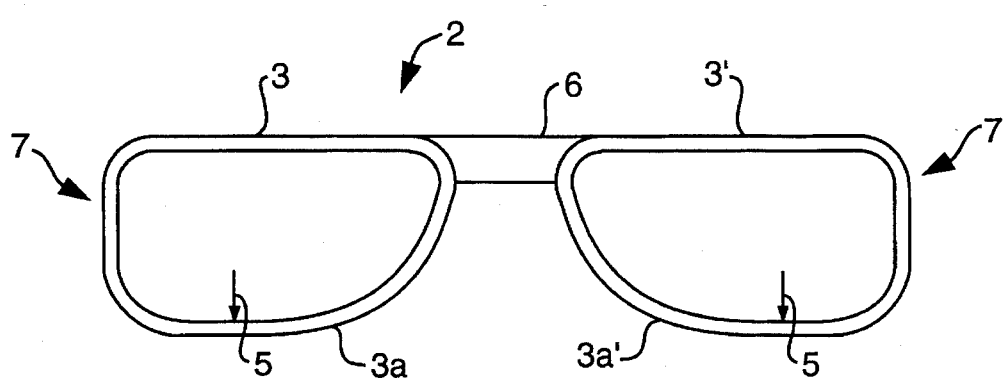
FIG. 20(b) is a front view of the eyeglass frame of FIG. 20(a)

A part of the left lens frame 501 with which the feeler 356 is brought into contact when the measurement is started is a part of the stepped portion 156b shown in FIG. 4 with which the lens frame 501 comes in contact. That is, it is the part 3a' of the lens frame 3' in FIG. 20.

Even when the measurement of the configuration of the left lens frame 501 is completed, the feeler 356 is placed at the above-mentioned part of the stepped portion 156b and the part 3a' of the lens frame 3'.

For this reason, a case might possibly occur in which the feeler 356 deviates greatly from a part of the stepped portion 156b with which the right lens frame 501 must come in contact when the feeler 356 is inserted into the right lens frame 501 in step 8.

If so, the arithmetic and control circuit 600 first controls the motor 209 so as to rotate the hands 211, 212 and the frame holder 100 upward and downward, and then adjusts the height of the V-shaped groove 502 of the lens frame 501 of the eyeglass frame 500 held by the frame holder 100 with respect to the reference surface so as to equalize the height of the V-shaped groove 502 with that of the feeler 356. As a result, the feeler 356 situated in the initialized horizontal position can be easily engaged with the V-shaped groove 502. This engagement can be easily carried out in an optional position.

Figure 20C:
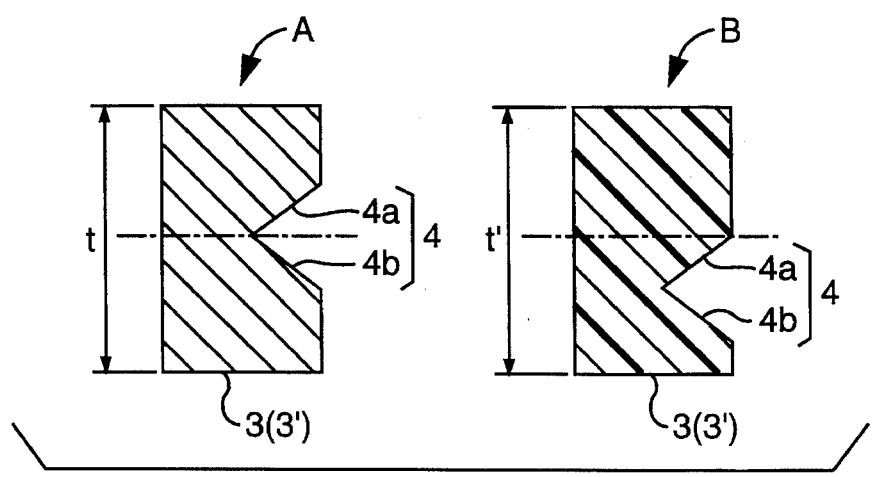
FIG. 20(c) shows sectional views of the lens frames of the eyeglass frame.
Figure 21A:
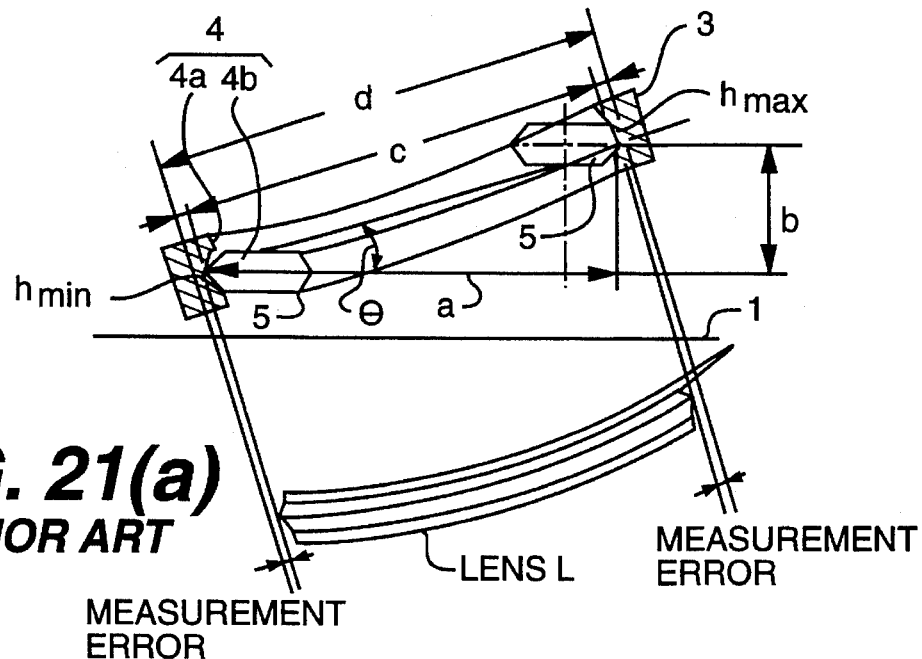
FIG. 21(a) is a descriptive drawing showing conventional measurement of a lens frame configuration.
Figure 21B:
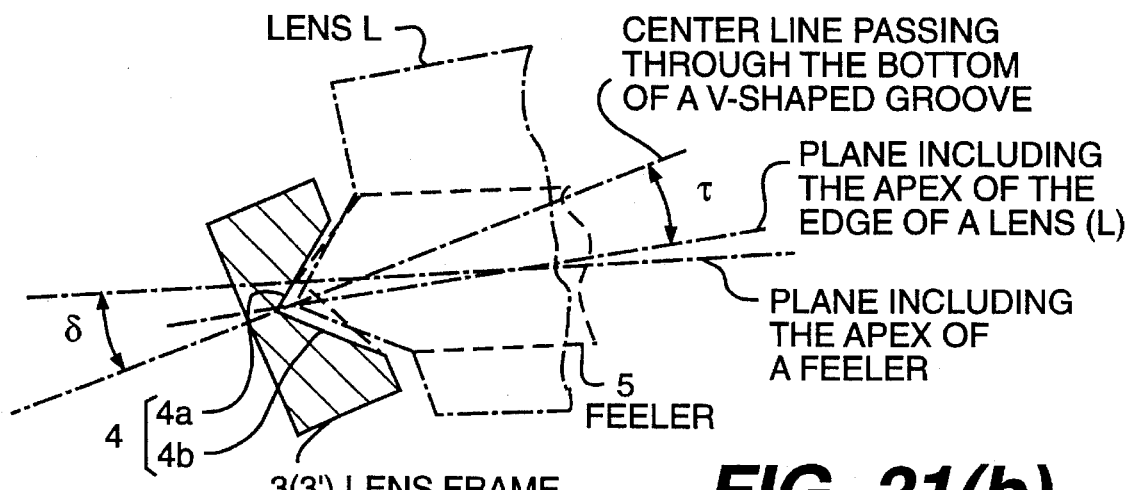
FIG. 21(b) is an enlarged view of FIG. 21(a)
Figure 21C:
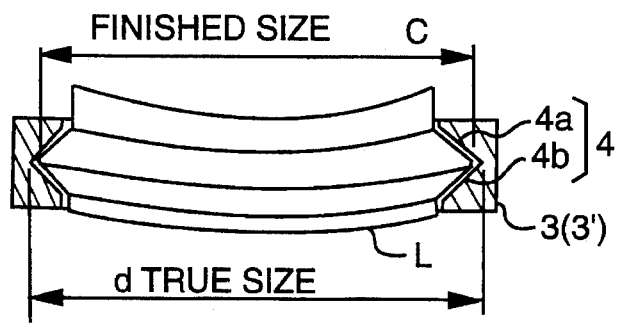
FIG. 21(c) shows the relationship between a lens frame and a lens ground according to a conventional frame configuration measuring method.

Therefore, the above-mentioned adjustment will have a considerable effect when an accurate measurement is taken of the configuration of the lens frame of a plastic eyeglass frame in which the V-shaped groove deviates greatly from the center of the thickness of the lens frame, as shown by the arrow B in FIG. 20(c).

As mentioned above, according to the present invention, the arithmetic and control circuit calculates an inclination of V-shaped groove of one of the lens frames with respect to the reference surface from provisional configuration data about the lens frame obtained by the measuring means and, based on the inclination, the arithmetic and control circuit controls the driving means to incline the frame holding means while the measuring means measures true amended configuration data about the lens frame. Subsequently, the measuring means measures provisional configuration data about the other one of the lens frames and then a difference between the amended configuration data and the provisional configuration data is added to the provisional configuration data about the other lens frame in order to obtain true configuration data about the other lens frame. Therefore, the measurement can be quickly carried out because a part of a measurement process of the other lens frame is omitted.

Further, the engagement of the V-shaped groove measuring means with the V-shaped groove can be easily carried out such that the driving means is controlled to rotate and incline the frame holding means and thereby a part of the lens frame other than a part in which the measuring means and the V-shaped groove are engaged with each other is made horizontal and further the horizontal part of the lens frame is adjusted to have the same height as an initialized horizontal position.

What is claimed is:

1. A method of measuring a frame configuration, comprising:

a first step of bringing a feeler as a measuring means into contact with a V-shaped groove of a lens frame of an eyeglass frame held by a frame holding means and moving said feeler along said V-shaped groove so as to obtain radius vector information $({_\phi}\rho_n, {_\phi}\theta_n)$ about said V-shaped groove in radial directions, obtain height data $Z_n$ in a direction of a Z-axis relative to said radius vector information $({_\phi}\rho_n, {_\phi}\theta_n)$, and obtain three-dimensional lens frame configuration information $({_\phi}\rho_n, {_\phi}\theta_n, Z_n)$;

a second step of calculating an angle $\theta$ of inclination of said lens frame from the maximum and minimum of said height data $Z_n$; and a third step of, if said angle $\theta$ exceeds a given angle $\beta$, rotating and inclining said frame holding means so as to make said angle $\theta$ smaller than said given angle $\beta$ and again obtaining height data $Z_n$ in said direction of the Z-axis relative to said radius vector information $({_\phi}\rho_n, {_\phi}\theta_n)$ and thereby obtaining new lens frame configuration information $({_\phi}\rho_n', {_\phi}\theta_n, Z_n)$ in three dimensional directions.

2. A method of measuring a frame configuration, comprising:

a first step of bringing a feeler as a measuring means into contact with a V-shaped groove of one of lens frames of an eyeglass frame held by a frame holding means and moving said feeler along said V-shaped groove so as to obtain radius vector information $({_\phi}\rho_n, {_\phi}\theta_n)$ about said V-shaped groove in radial directions, obtain height data $Z_n$ in a direction of a Z-axis relative to said radius vector information $({_\phi}\rho_n, {_\phi}\theta_n)$, and obtain first provisional three-dimensional lens frame configuration information $({_\phi}\rho_n, {_\phi}\theta_n, Z_n)$ about said lens frame;

a second step of calculating an angle $\theta$ of inclination of said lens frame from the maximum and minimum of said height data $Z_n$;

a third step of, if said angle $\theta$ of inclination exceeds a given angle $\beta$, rotating and inclining said frame holding means so as to make said angle $\theta$ smaller than said given angle $\beta$ and again obtaining height data $Z_n$ in said direction of the Z-axis relative to said radius vector information $({_\phi}\rho_n, {_\phi}\theta_n)$ and thereby obtaining first true lens frame configuration information $({_\phi}\rho_n', {_\phi}\theta_n, Z_n)$ in three dimensional directions;

a fourth step of bringing said feeler into contact with a V-shaped groove of the other one of said lens frames and moving said feeler along said V-shaped groove so as to obtain radius vector information $({_\phi}\rho_n, {_\phi}\theta_n)$ about said V-shaped groove in radial directions and obtain height data $Z_n$ in said direction of the Z-axis relative to said radius vector information $({_\phi}\rho_n, {_\phi}\theta_n)$ and, as a result, obtain second provisional lens frame configuration information $({_\phi}\rho_n, {_\phi}\theta_n, Z_n)$ about said other lens frame in three dimensional directions;

a fifth step of calculating a radius vector information difference $\Delta\rho_n$ ($\Delta\rho_n = \rho_n' - \rho_n$) per rotation angle $\theta_n$ from said first provisional lens frame configuration information $({_\phi}\rho_n, {_\phi}\theta_n, Z_n)$ and said first true lens frame configuration information $({_\phi}\rho_n', {_\phi}\theta_n, Z_n)$; and a sixth step of obtaining second true lens frame configuration information $(({_\phi}\rho_n + \Delta\rho_n), {_\phi}\theta_n, Z_n)$ by adding said radius vector information difference $\Delta\rho_n$ to a radius vector $\rho_n$ per rotation angle $\theta$ of said second provisional lens frame configuration information $({_\phi}\rho_n, {_\phi}\theta_n, Z_n)$ obtained in said fourth step.

3. An apparatus for measuring a frame configuration, comprising:

an apparatus body provided with a measuring reference surface;

frame holding means for simultaneously holding right and left lens frames of an eyeglass frame, said frame holding means being movably fixed to said apparatus body so as to rotate and incline a holding plane of said lens frames with respect to said reference surface;

rotating means for rotating and inclining said frame holding means;

measuring means for measuring coordinates of each point in radial directions of a V-shaped groove of each of said lens frames with respect to said reference surface; and an arithmetic and control circuit for calculating an inclination of said lens frame in said V-shaped groove with respect to said reference surface from a result obtained by said measuring means;

wherein said arithmetic and control circuit calculates an inclination of one of said lens frames in a V-shaped groove thereof with respect to said reference surface from provisional configuration data about said lens frame obtained by said measuring means and, based on said inclination, controls said rotating means to rotate and incline said frame holding means while causing said measuring means to measure true amended configuration data about said lens frame.

4. An apparatus for measuring a frame configuration, comprising:

an apparatus body provided with a measuring reference surface;

frame holding means for simultaneously holding right and left lens frames of an eyeglass frame, said frame holding means being movably fixed to said apparatus body so as to rotate and incline a holding plane of said lens frames with respect to said reference surface;

rotating means for rotating and inclining said frame holding means;

measuring means for measuring coordinates of each point in radial directions of a V-shaped groove of each of said lens frames with respect to said reference surface; and an arithmetic and control circuit for calculating an inclination of said lens frame in said V-shaped groove with respect to said reference surface from a result obtained by said measuring means;

wherein said arithmetic and control circuit calculates an inclination of one of said lens frames in a V-shaped groove thereof with respect to said reference surface from provisional configuration data about said one lens frame by said measuring means and, based on said inclination, controls said rotating means to rotate and incline said frame holding means while causing said measuring means to measure true amended configuration data about said one lens frame and, after that, calculates a data difference between said true amended configuration data and provisional configuration data about the other one of said lens frames measured by said measuring means and adds said data difference to said provisional configuration data about said other lens frame to obtain true configuration data about said other lens frame.

* * * * *